United States Patent
Fields et al.

(10) Patent No.: US 8,190,183 B2
(45) Date of Patent: May 29, 2012

(54) SYSTEM AND METHOD FOR DIFFERENTIATING BETWEEN INCOMING AND OUTGOING MESSAGES AND IDENTIFYING CORRESPONDENTS IN A TTY COMMUNICATION

(75) Inventors: Gregory J. Fields, Waterloo (CA);
Gerhard D. Klassen, Waterloo (CA);
David J. Dougall, Waterloo (CA);
Mohamed Farid, North York (CA)

(73) Assignee: Research In Motion Limited, Waterloo (CA)

( * ) Notice: Subject to any disclaimer, the term of this patent is extended or adjusted under 35 U.S.C. 154(b) by 367 days.

(21) Appl. No.: 12/551,089

(22) Filed: Aug. 31, 2009

(65) Prior Publication Data
US 2009/0323905 A1 Dec. 31, 2009

Related U.S. Application Data

(63) Continuation-in-part of application No. 12/039,860, filed on Feb. 29, 2008, now Pat. No. 7,957,717.

(51) Int. Cl.
*H04M 9/00* (2006.01)
*H04M 11/00* (2006.01)

(52) U.S. Cl. .............................. 455/466; 455/401; 379/52

(58) Field of Classification Search ................... 455/401, 455/466, 403, 67.7, 66.1, 557; 379/52; 340/4.1, 340/4.13
See application file for complete search history.

(56) References Cited

U.S. PATENT DOCUMENTS

| | | | |
|---|---|---|---|
| 5,327,479 A | 7/1994 | Engelke et al. | |
| 5,701,588 A | 12/1997 | Morita et al. | |
| 5,915,000 A | 6/1999 | Nguyen et al. | |
| 5,933,476 A | 8/1999 | Hansen et al. | |
| 5,940,475 A | 8/1999 | Hansen | |
| 5,982,853 A | 11/1999 | Liebermann | |
| 6,002,749 A | 12/1999 | Hansen et al. | |
| 6,075,841 A | 6/2000 | Engelke et al. | |
| 6,381,472 B1 * | 4/2002 | LaMedica et al. | 455/560 |
| 6,728,342 B2 | 4/2004 | Lund | |
| 7,079,628 B1 | 7/2006 | Burritt et al. | |
| 7,099,440 B2 * | 8/2006 | Michaelis | 379/52 |
| 7,170,976 B1 | 1/2007 | Keagy | |
| 7,200,208 B2 | 4/2007 | Smith, Jr. et al. | |
| 7,496,356 B2 * | 2/2009 | Shiomi et al. | 455/414.4 |
| 7,573,985 B2 * | 8/2009 | McClelland et al. | 379/52 |

(Continued)

FOREIGN PATENT DOCUMENTS

EP 1677493 A1 5/2006

(Continued)

OTHER PUBLICATIONS

Sample Screen; http://www.idrt.com/images/328.jpg; Initially retrieved May 22, 2007.

(Continued)

*Primary Examiner* — Sonny Trinh
(74) *Attorney, Agent, or Firm* — Brett J. Slaney; Blake, Cassels & Graydon LLP

(57) ABSTRACT

A method and system are provided that examine incoming and outgoing TTY transmissions to determine an identifier for distinguishing between correspondents in a TTY call. The system may utilize contact information associated with an incoming or outgoing call to provide visual distinctions, and/or flow control, to the text from each party as it is displayed on a TTY device.

27 Claims, 15 Drawing Sheets

U.S. PATENT DOCUMENTS

| | | |
|---|---|---|
| 2003/0210767 A1 | 11/2003 | Lund |
| 2004/0013242 A1 | 1/2004 | Engelke et al. |
| 2004/0137944 A1* | 7/2004 | Lee et al. ............... 455/557 |
| 2005/0063520 A1 | 3/2005 | Michaelis |
| 2006/0126802 A1 | 6/2006 | Kerns et al. |
| 2006/0140353 A1 | 6/2006 | Jung |
| 2006/0171510 A1 | 8/2006 | Mundra et al. |
| 2007/0003025 A1 | 1/2007 | Alves et al. |

FOREIGN PATENT DOCUMENTS

| | | |
|---|---|---|
| EP | 2 096 848 A1 * | 2/2008 |

OTHER PUBLICATIONS

"i711 Wireless for BlackBerry"; 2006; pp. 1 to 28; Retrieved on Jul. 7, 2008 from http://www.i711.com/wireless/i711WirelessBBUserGuide.pdf.

"NTS 6.0 Network Telephony Services"; May 10, 2005; pp. 1 to 8; NXI Communications; Retrieved on Jul. 7, 2008 from http://www.nextalk.com/pdf_files/NTS_Overview_6_0.pdf.

"NexTalk 4.0 User's Guide"; Feb. 25, 2003; pp. 1 to 32; Retrieved on Jul. 7, 2008 from http://www.nextalk.com/pdf_files/Client4_0.pdf.

Sorrentino, Andrea; Search Report from European Application No. 08152130.4; Jul. 7, 2008.

* cited by examiner

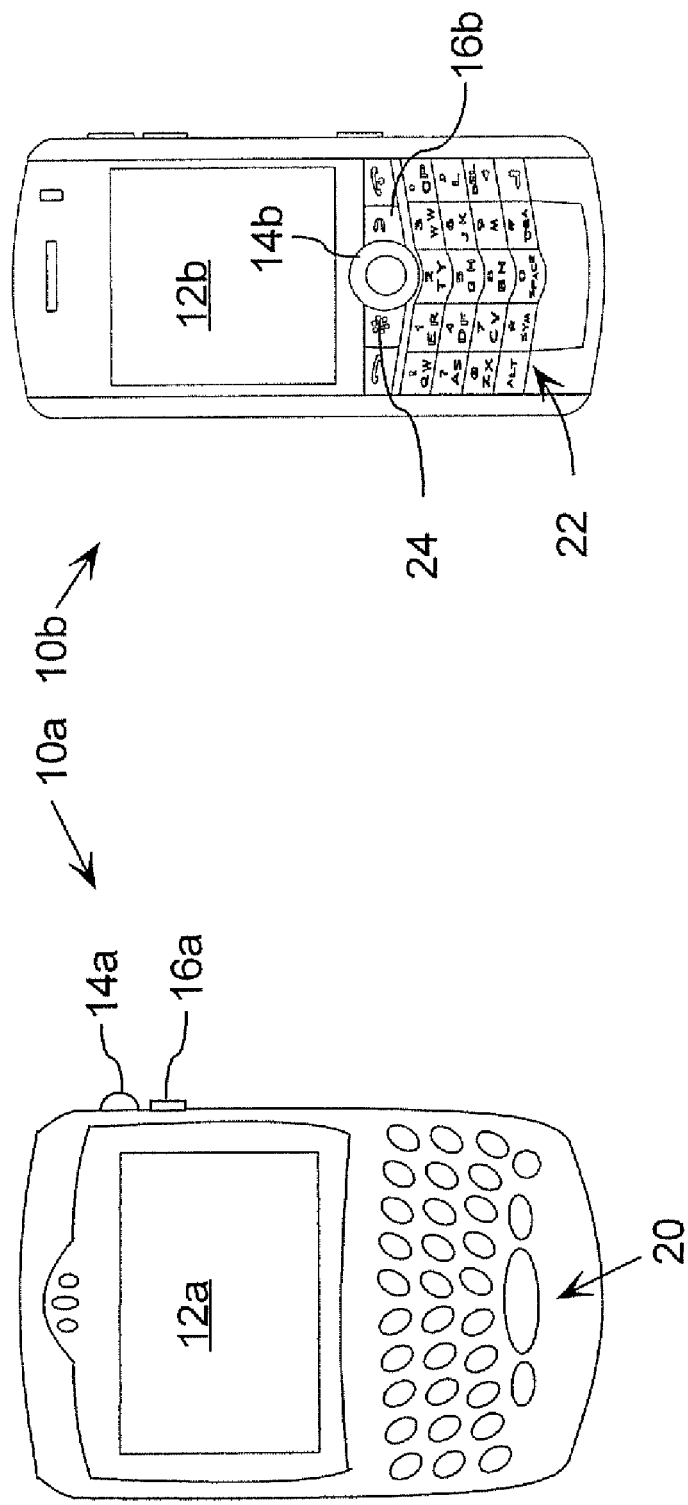

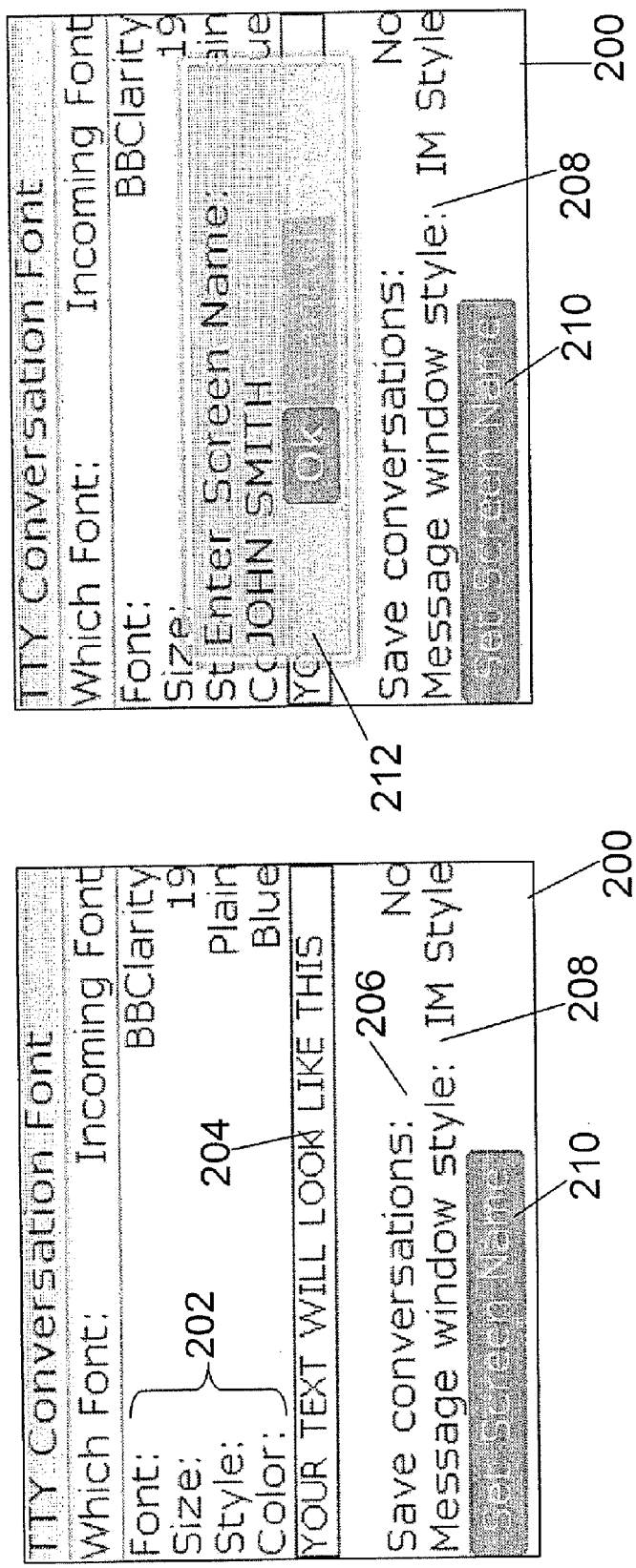

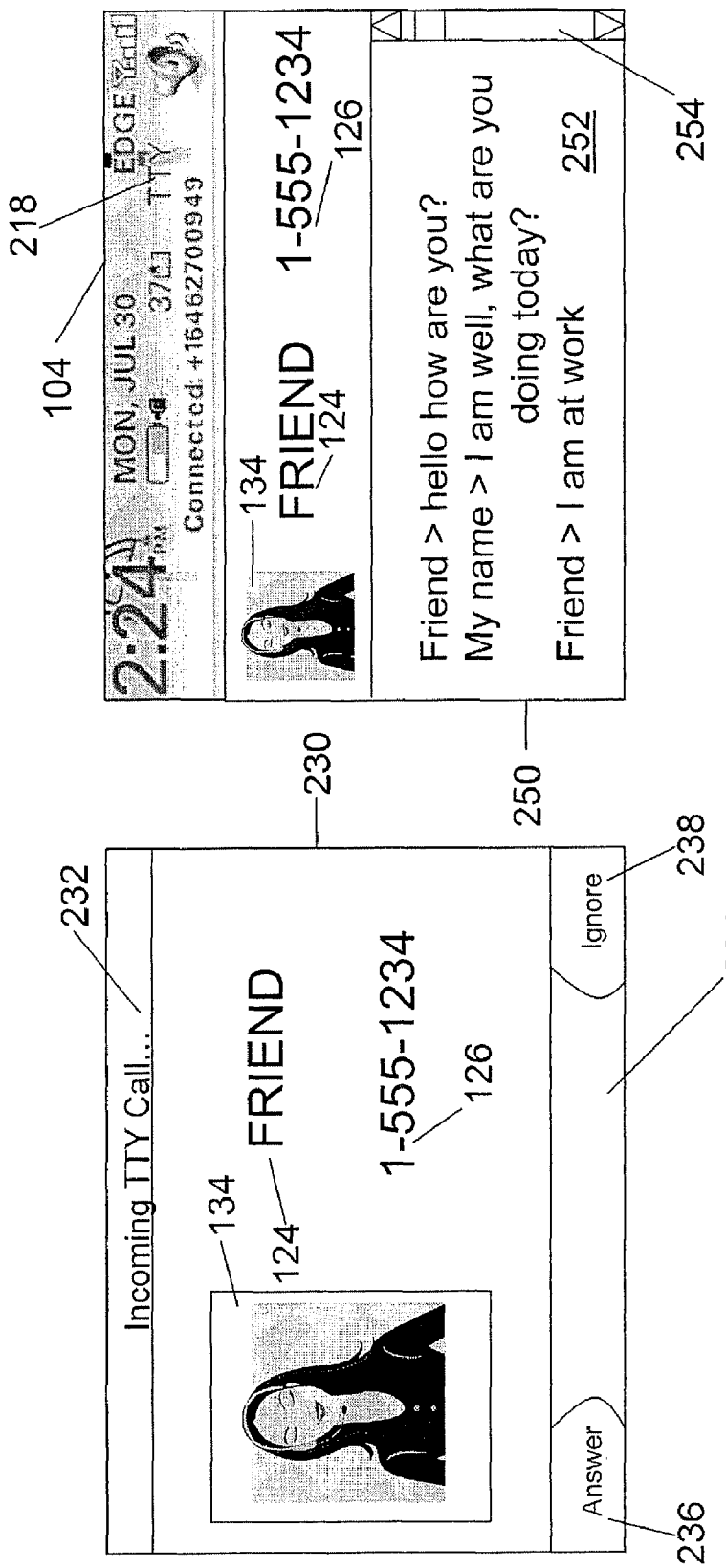

TTY Display Styles/Modes

Buffered Entry

Buffered Entry
Separate Screen Area

Figs. 19A & 19B
Character Streams
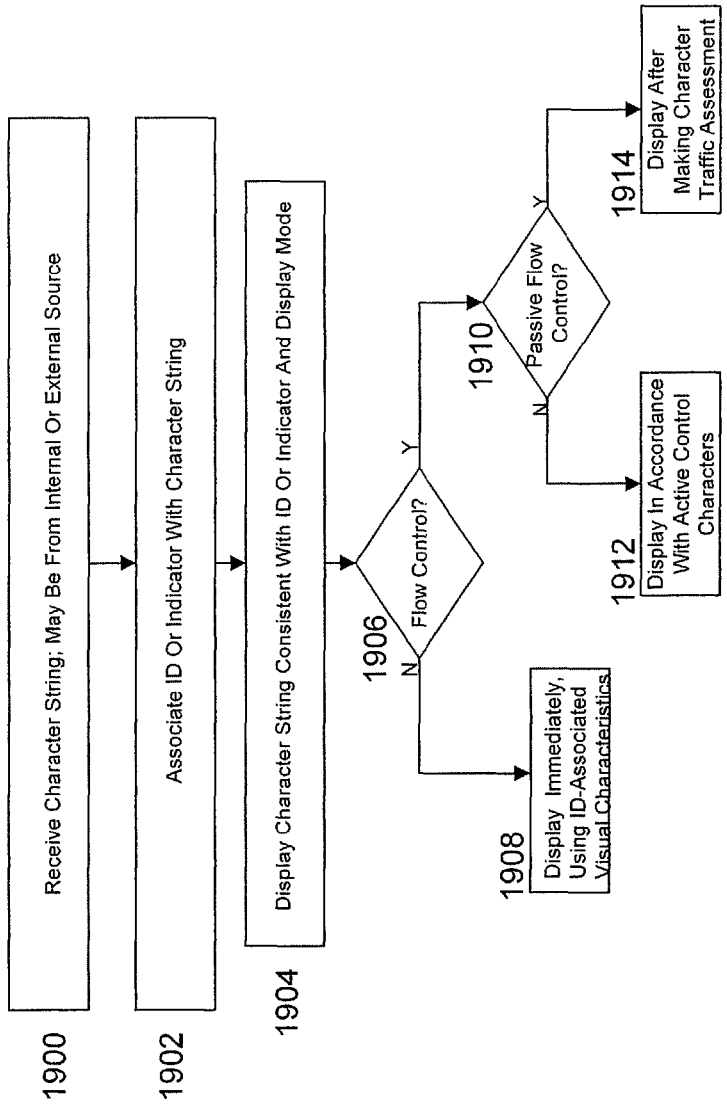
Fig. 19A
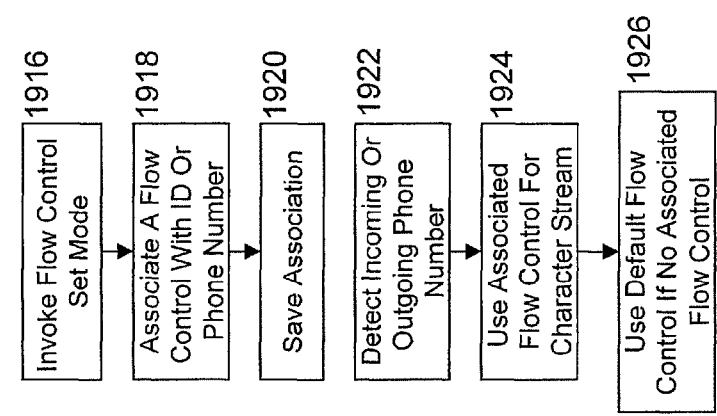
Fig. 19B

SYSTEM AND METHOD FOR DIFFERENTIATING BETWEEN INCOMING AND OUTGOING MESSAGES AND IDENTIFYING CORRESPONDENTS IN A TTY COMMUNICATION

This application is a continuation-in-part of U.S. application Ser. No. 12/039,860 filed on Feb. 29, 2008, the contents of which are incorporated herein by reference.

TECHNICAL FIELD

The following relates to identifying on a mobile device an other party in a teletypewriter (TTY) exchange.

DESCRIPTION OF THE PRIOR ART

Teletypewriters (TTYs), also known as telecommunication devices for the deaf (TDDs), enable the hearing impaired to communicate through the telephone system. Typically, a TTY is a device which can connect to a telephone or existing telephone line. In a common implementation, tone sequences transmitted by a TTY device representing a text message from a sender are received by a counterpart TTY device at the receiving end. During transmission, the tone sequences are typically converted to signals represented by zeroes and ones by a transmission protocol such as the 5-bit Baudot Code which maps 5-bit tone sequences to letters, numbers, and punctuation to allow transmission of text messages between the corresponding parties.

Typical uses of TTY have well known limitations. For example, TTY text message is displayed in a single line whereby TTY "etiquette" is required to ascertain which correspondent should be typing next. This, in conjunction with the serial processing of TTY signals makes traditional TTY inflexible for modern communications systems.

There exist solutions for transmitting TTY signals through other telecommunications devices such as networked computers and mobile phones. However, such arrangements require that a traditional TTY device connect into the other telecommunications device and may require the TTY device at the other end to also use a telecommunications device for receiving the signal and translating the transmission back to a TTY signal. Moreover, the actual conversation is typically hosted by the TTY device since the TTY interface is often more familiar to the impaired user. Therefore, use of the intermediate telecommunications device is only meant to facilitate the transmission over alternative communication networks.

BRIEF DESCRIPTION OF THE DRAWINGS

Embodiments will now be described by way of example only with reference to the appended drawings wherein:

FIG. 1 is a schematic diagram of an example mobile device and a display screen therefor.

FIG. 2 is a schematic diagram of another example mobile device and a display screen therefor.

FIG. 9 is a screen shot showing a TTY application font settings interface.

FIG. 10 is a screen shot showing the interface of FIG. 11 during modification of a name option.

FIG. 14 is a screen shot showing an interface for an incoming TTY call.

FIG. 15 is a screen shot showing a TTY conversation interface in another example embodiment.

FIG. 19 is a set of flow diagrams for character stream display modes.

DETAILED DESCRIPTION OF THE DRAWINGS

Figure 3:
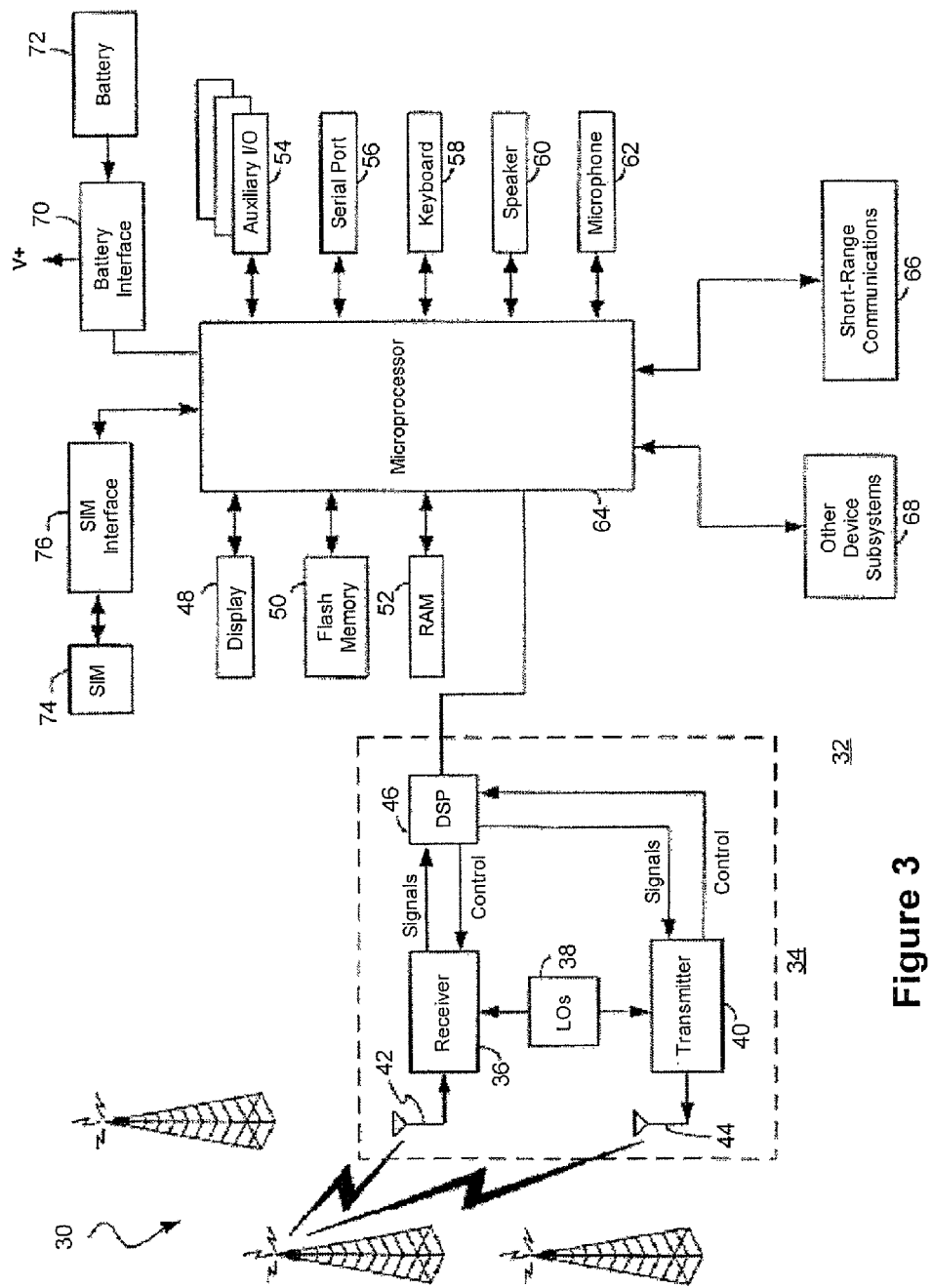
FIG. 3 is a schematic block diagram of components of the example mobile device of any or both of FIGS. 1 and 2.

It has been recognized that by examining incoming or outgoing TTY transmissions associated with a TTY call on a mobile device, identifiers can be determined that are associated with a respective correspondent and then used to modify the mobile device display to identify the respective correspondent. For example, caller identification data associated with an incoming TTY transmission can be used to search a locally stored address book to obtain information for the respective correspondent that can be used to provide more context to the user. This can be particularly useful for mobile TTY users with cognitive impairments. The identifier determined from the TTY transmission can also be used to modify and enhance display settings, for example by modifying the font or inserting line breaks or to include a name to identify the correspondent responsible for the text in the TTY call. The identifier determined from the incoming or outgoing TTY transmission is in one example determined when a TTY call begins and used to provide data on an incoming TTY call screen.

Typically, mobile devices are configured to notify users of an incoming call by displaying an incoming call screen in which details of the call are presented to the mobile user. For example, text data comprising a name and telephone number associated with the originating call may be displayed in the incoming call screen. For mobile users with cognitive impairments, the ability to conduct critical reasoning in determining whether or not to accept or ignore an incoming call is further simplified with a TTY incoming call screen (as well as the conversation screen) that includes, in particular, the picture from a contact database referenced by an address book. This is because the user can choose to accept or deny an TTY incoming call based on either picture alone, phone number alone, name alone or any combination of two or more of these contextual elements. This added functionality can decrease user error, increase the speed by which users can process the TTY incoming call, and generally adds to the overall user experience. The enhanced display features discussed below that are used to assist users with hearing impairments can also benefit any user.

Referring now to FIGS. 1 and 2, one embodiment of a mobile device 10a is shown in FIG. 1, and another embodiment of a mobile device 10b is shown in FIG. 2. It will be appreciated that the numeral "10" will hereinafter refer to any mobile device 10, including the embodiments 10a and 10b. It will also be appreciated that a similar numbering convention may be used for other general features common between FIGS. 1 and 2 such as a display 12, a positioning device 14, and a cancel or escape button 16.

Examples of applicable communication devices (herein referred to collectively as "mobile devices 10" for clarity) include pagers, cellular phones, cellular smart-phones, wireless organizers, personal digital assistants, computers, laptops, handheld wireless communication devices, wirelessly enabled notebook computers, mobile TTY machines and TTY devices. TTY-devices further include but are not limited to TTY-compatible devices such as a smart phone or PDA with a TTY-port or any other user equipment (UE) usable in a telecommunications system, or, an application on the TTY device that allows it to act like a TTY device (be used as a TTY compatible device).

The mobile device is a two-way communication device with advanced data communication capabilities including the capability to communicate with other mobile devices or computer systems through a network of transceiver stations. The mobile device 10 also has the capability to allow voice communication. Depending on the functionality provided by the mobile device 10, it may be referred to as a data messaging device, a two-way pager, a cellular telephone with data messaging capabilities, a wireless Internet appliance, or a data communication device (with or without telephony capabilities).

The mobile device 10a shown in FIG. 1 comprises a display 12a and the cursor or view positioning device 14 shown in this embodiment is a positioning wheel 14a. Positioning device 14 may serve as another input member and is both rotatable to provide selection inputs to the processor 238 (shown in FIG. 3) and can also be pressed in a direction generally toward a housing of the mobile device 10a to provide another selection input to the processor 238. The display 12 may include a selection cursor 18 (see FIG. 5) that depicts generally where the next input or selection will be received. The selection cursor 18 may comprise a box, alteration of an icon or any combination of features that enable the user to identify the currently chosen icon or item. The mobile device 10a in FIG. 1 also comprises an escape or cancel button 16a and a keyboard 20. In this example, the keyboard 20 is disposed on the front face of the mobile device housing and positioning device 14 and cancel button 16a are disposed at the side of the housing to enable a user to manoeuvre the positioning wheel 14a while holding the mobile device 10 in one hand. The keyboard 20 is in this embodiment a standard QWERTY keyboard.

The mobile device 10b shown in FIG. 2 comprises a display 12b and the positioning device 14 in this embodiment is a trackball 14b. Trackball 14b permits multi-directional positioning of the selection cursor 18 such that the selection cursor 18 can be moved in an upward direction, in a downward direction and, if desired and/or permitted, in any diagonal direction. The trackball 14b is preferably situated on the front face of a housing of the mobile device 10b as shown in FIG. 2 to enable a user to manoeuvre the trackball 14b while holding the mobile device 10b in one hand. The trackball 14b may serve as another input member (in addition to a directional or positioning member) to provide selection inputs to the processor 238 and can preferably be pressed in a direction towards the housing of the mobile device 10b to provide such a selection input.

The mobile device 10b also comprises a menu or option button 24 that loads a menu or list of options on display 12b when pressed, and a cancel or escape button 16b to exit, "go back" or otherwise escape from a feature, option, selection or display. The mobile device 10b as illustrated in FIG. 2, comprises a reduced QWERTY keyboard 22. In this embodiment, the keyboard 22, positioning device 14, escape button 16b and menu button 24 are disposed on a front face of the mobile device housing.

The reduced QWERTY keyboard 22 comprises a plurality of multi-functional keys and corresponding indicia including keys associated with alphabetic characters corresponding to a QWERTY array of letters A to Z and an overlaid numeric phone key arrangement. The plurality of keys that comprise alphabetic and/or numeric characters total fewer than twenty-six (26). In the example embodiment shown in FIG. 2, the number of keys that comprise alphabetic and numeric characters is fourteen (14). In this embodiment, the total number of keys, including other functional keys, is twenty (20). The plurality of keys may comprise four rows and five columns of keys, with the four rows comprising in order a first, second, third and fourth row, and the five columns comprising in order a first, second, third, fourth, and fifth column. The QWERTY array of letters is associated with three of the four rows and the numeric phone key arrangement is associated with each of the four rows.

The numeric phone key arrangement is associated with three of the five columns. Specifically, the numeric phone key arrangement may be associated with the second, third and fourth columns. The numeric phone key arrangement may alternatively be associated with keys in the first, second, third, and fourth rows, with keys in the first row including a number "1" in the second column, a number "2" in the third column, and a number "3" in the fourth column. The numeric phone keys associated with keys in the second row include a number "4" in the second column, a number "5" in the third column, and a number "6" in the fourth column. The numeric phone keys associated with keys in the third row include a number "7" in the second column, a number "8" in the third column, and a number "9" in the fourth column. The numeric phone keys associated with keys in the fourth row may include a "*" in the second column, a number "0" in the third column, and a "#" in the fourth column.

The physical keyboard may also include a function associated with at least one of the plurality of keys. The fourth row of keys may include an "alt" function in the first column, a "next" function in the second column, a "space" function in the third column, a "shift" function in the fourth column, and a "return/enter" function in the fifth column.

The first row of five keys may comprise keys corresponding in order to letters "QW", "ER", "TY", "UI", and "OP". The second row of five keys may comprise keys corresponding in order to letters "AS", "DF", "GH", "JK", and "L". The third row of five keys may comprise keys corresponding in order to letters "ZX", "CV", "BN", and "M".

It will be appreciated that for the mobile device 10, a wide range of one or more positioning or cursor/view positioning mechanisms such as a touch pad, a joystick button, a mouse, a touchscreen, set of arrow keys, a tablet, an accelerometer (for sensing orientation and/or movements of the mobile device 10 etc.), or other input devices as contemplated by those skilled in the art may be employed. Similarly, any variation of keyboard 20, 22 may be used. It will also be appreciated that the mobile devices 10 shown in FIGS. 1 and 2 are for illustrative purposes only and various other mobile devices 10, are equally applicable to the following examples. It will be appreciated that other regular or reduced keyboard configurations may also be used, for example, AZERTY, DVORAK, etc.

Movement, navigation, and/or scrolling with use of a cursor/view positioning device 14 (e.g. trackball 14b or positioning wheel 14a) is beneficial given the relatively large size of visually displayed information and the compact size of display 12, and since information and messages are typically only partially presented in the limited view of display 12 at any given moment. As previously described, positioning device 14 (namely positioning wheel 14a and trackball 14b), are helpful cursor/view positioning mechanisms to achieve such movement. Positioning device 14, which may be referred to as a positioning wheel or scroll device 14a in one embodiment (FIG. 1), specifically includes a circular disc which is rotatable about a fixed axis of housing and may be rotated by the end user's index finger or thumb. As noted above, in another embodiment (FIG. 2) the trackball 14b comprises a multi-directional member that enables upward, downward and if desired, diagonal movements. The multi-directional movements afforded, in particular, by the trackball 14b and the presentation of icons and folders on display 12 provides the user with flexibility and familiarity of the layout of a traditional desktop computer interface. Also, the positioning device 14 enables movement and selection operations to be executed on the mobile device 10 using one hand. The trackball 14b in particular also enables both one-handed use and the ability to cause a cursor 18 to traverse the display 12 in more than one direction.

FIG. 3 is a detailed block diagram of an example mobile station 32 of the present disclosure. The term "mobile station" will herein refer to the operable components of, e.g. mobile device 10. Mobile station 32 is preferably a two-way communication device having at least voice and advanced data communication capabilities, including the capability to communicate with other computer systems. Depending on the functionality provided by mobile station 32, it may be referred to as a data messaging device, a two-way pager, a cellular telephone with data messaging capabilities, a wireless Internet appliance, or a data communication device (with or without telephony capabilities) such as either of the example mobile devices 10 shown in FIGS. 1 and 2. Mobile station 32 may communicate with any one of a plurality of fixed transceiver stations 30 within its geographic coverage area.

Mobile station 32 will normally incorporate a communication subsystem 34 which includes a receiver 36, a transmitter 40, and associated components such as one or more (preferably embedded or internal) antenna elements 42 and 44, local oscillators (LOs) 38, and a processing module such as a digital signal processor (DSP) 46. As will be apparent to those skilled in field of communications, particular design of communication subsystem 34 depends on the communication network in which mobile station 32 is intended to operate.

Mobile station 32 may send and receive communication signals over a network after required network registration or activation procedures have been completed. Signals received by antenna 44 through the network are input to receiver 36, which may perform such common receiver functions as signal amplification, frequency down conversion, filtering, channel selection, and like, and in example shown in FIG. 3, analog-to-digital (A/D) conversion. A/D conversion of a received signal allows more complex communication functions such as demodulation and decoding to be performed in DSP 46. In a similar manner, signals to be transmitted are processed, including modulation and encoding, for example, by DSP 46. These DSP-processed signals are input to transmitter 40 for digital-to-analog (D/A) conversion, frequency up conversion, filtering, amplification and transmission over communication network via antenna 44. DSP 46 not only processes communication signals, but also provides for receiver and transmitter control. For example, the gains applied to communication signals in receiver 36 and transmitter 40 may be adaptively controlled through automatic gain control algorithms implemented in DSP 46.

Network access is associated with a subscriber or user of mobile station 32. In one embodiment, mobile station 32 uses a Subscriber Identity Module or "SIM" card 74 to be inserted in a SIM interface 76 in order to operate in the network. SIM 74 is one type of a conventional "smart card" used to identify an end user (or subscriber) of the mobile station 32 and to personalize the device, among other things. Without SIM 74, the mobile station terminal in such an embodiment is not fully operational for communication through a wireless network. By inserting SIM 74 into mobile station 32, an end user can have access to any and all of his/her subscribed services. SIM 74 generally includes a processor and memory for storing information. Since SIM 74 is coupled to a SIM interface 76, it is coupled to microprocessor 64 through communication lines. In order to identify the subscriber, SIM 74 contains some user parameters such as an International Mobile Subscriber Identity (IMSI). An advantage of using SIM 74 is that end users are not necessarily bound by any single physical mobile station. SIM 74 may store additional user information for the mobile station as well, including datebook (or calendar) information and recent call information. It will be appreciated that mobile station 32 may also be used with any other type of network compatible mobile device 10 such as those being code division multiple access (CDMA) enabled and should not be limited to those using and/or having a SIM card 74.

Mobile station 32 is a battery-powered device so it also includes a battery interface 70 for receiving one or more rechargeable batteries 72. Such a battery 72 provides electrical power to most if not all electrical circuitry in mobile station 32, and battery interface 70 provides for a mechanical and electrical connection for it. The battery interface 70 is coupled to a regulator (not shown) which provides a regulated voltage V to all of the circuitry.

Mobile station 32 in this embodiment includes a microprocessor 64 which controls overall operation of mobile station 32. It will be appreciated that the microprocessor 64 may be implemented by any processing device. Communication functions, including at least data and voice communications are performed through communication subsystem 34. Microprocessor 64 also interacts with additional device subsystems which may interface with physical components of the mobile device 10. Such addition device subsystems comprise a display 48, a flash memory 50, a random access memory (RAM) 52, auxiliary input/output subsystems 54, a serial port 56, a keyboard 58, a speaker 60, a microphone 62, a short-range communications subsystem 66, and any other device subsystems generally designated at 68. Some of the subsystems shown in FIG. 3 perform communication-related functions, whereas other subsystems may provide "resident" or on-device functions. Notably, some subsystems such as keyboard 58 and display 48, for example, may be used for both communication-related functions, such as entering a text message for transmission over a communication network, and device-resident functions such as a calculator or task list. Operating system software used by microprocessor 64 is preferably stored in a persistent store such as flash memory 50, which may alternatively be a read-only memory (ROM) or similar storage element (not shown). Those skilled in the art will appreciate that the operating system, specific device applications, or parts thereof, may be temporarily loaded into a volatile store such as RAM 52.

Microprocessor 64, in addition to its operating system functions, preferably enables execution of software applications on mobile station 32. A predetermined set of applications which control basic device operations, including at least data and voice communication applications, as well as the inventive functionality of the present disclosure, will normally be installed on mobile station 32 during its manufacture. A preferred application that may be loaded onto mobile station 32 may be a personal information manager (PIM) application having the ability to organize and manage data items relating to user such as, but not limited to, e-mail, calendar events, voice mails, appointments, and task items. Naturally, one or more memory stores are available on mobile station 32 and SIM 74 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 32 with respect to such items. This is especially advantageous where the host computer system is the mobile station user's office computer system. Additional applications may also be loaded onto mobile station 32 through network, an auxiliary subsystem 54, serial port 56, short-range communications subsystem 66, or any other suitable subsystem 68, and installed by a user in RAM 52 or preferably a non-volatile store (not shown) for execution by microprocessor 64. Such flexibility in application installation increases the functionality of mobile station 32 and may provide enhanced on-device functions, communication-related functions, or both. For example, secure communication applications may enable electronic commerce functions and other such financial transactions to be performed using mobile station 32.

In a data communication mode, a received signal such as a text message, e-mail message, SMS, MMS, PIN, or web page download will be processed by communication subsystem 34 and input to microprocessor 64. Microprocessor 64 will preferably further process the signal for output to display component 48 (for display 12) or alternatively to auxiliary I/O device 54. A user of mobile station 32 may also compose data items, such as e-mail messages, for example, using keyboard component 58 (for keyboard 20, 22) in conjunction with display 48 and possibly auxiliary I/O device 54. These composed items may be transmitted over a communication network through communication subsystem 34.

For voice communications, the overall operation of mobile station 32 is substantially similar, except that the received signals would be output to speaker 60 and signals for transmission would be generated by microphone 62. Alternative voice or audio I/O subsystems, such as a voice message recording subsystem, may also be implemented on mobile station 32. Although voice or audio signal output is preferably accomplished primarily through speaker 60, display 48 may also be used to provide an indication of the identity of a calling party, duration of a voice call, or other voice call related information, as some examples.

Serial port 56 in FIG. 3 is normally implemented in a personal digital assistant (PDA)-type communication device for which synchronization with a user's desktop computer is a desirable, albeit optional, component. Serial port 56 enables a user to set preferences through an external device or software application and extends the capabilities of mobile station 32 by providing for information or software downloads to mobile station 32 other than through a wireless communication network. The alternate download path may, for example, be used to load an encryption key onto mobile station 32 through a direct and thus reliable and trusted connection to thereby provide secure device communication.

Short-range communications subsystem 66 of FIG. 3 is an additional optional component which provides for communication between mobile station 32 and different systems or devices, which need not necessarily be similar devices. For example, subsystem 66 may include an infrared device and associated circuits and components, or a Bluetooth™ communication module to provide for communication with similarly enabled systems and devices. Bluetooth™ is a registered trademark of Bluetooth SIG, Inc.

Figure 4:
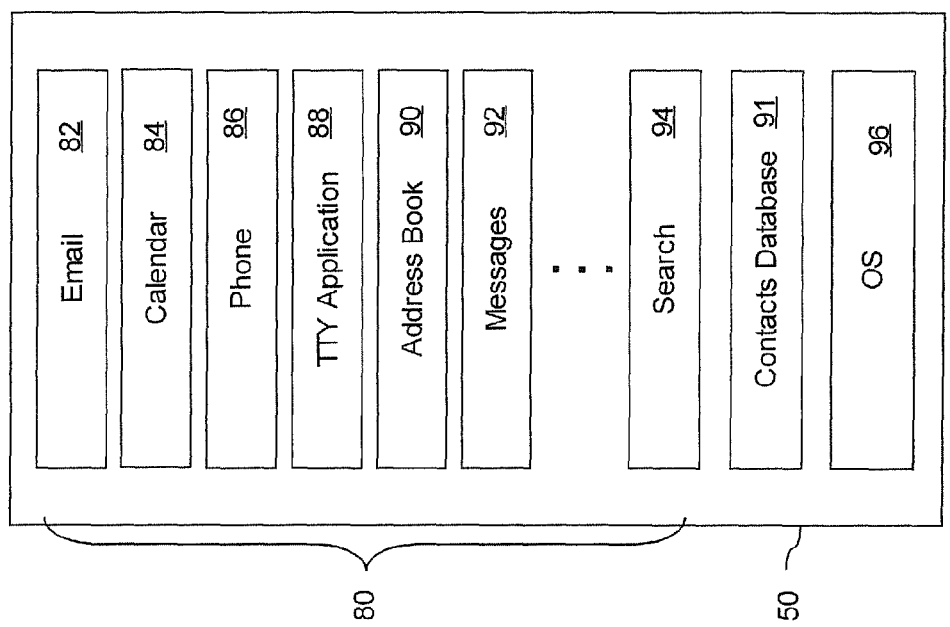
FIG. 4 is a schematic block diagram of the memory shown in FIG. 3.

As shown in FIG. 4, memory 50 includes a plurality of applications 80 associated with a series of icons 102 (see FIG. 5) for the processing of data. Applications 80 may be any variety of forms such as, without limitation, software, firmware, and the like. Applications 80 may include, for example, electronic mail (e-mail) 82, calendar program 84, phone application 86, a TTY application 88, address book 90, storage for messages 92, a search function and/or application 94 etc. An operating system (OS) 96 also resides in memory 50. Also shown in the example in FIG. 4 is a contacts database 91, which stores data concerning contacts in a user's address book 90. The mobile devices 10 of the present disclosure are also configured to enable communication between different ones of the applications 80, e.g. between address book 86 and the TTY application 88 or e-mail application 82. Also, the icons 102 for the applications on the mobile device 10 can be modified, named, moved, sorted and otherwise interacted with for the purposes of organizing and/or manipulating the visibility of the icons for those applications 80.

Figure 5:
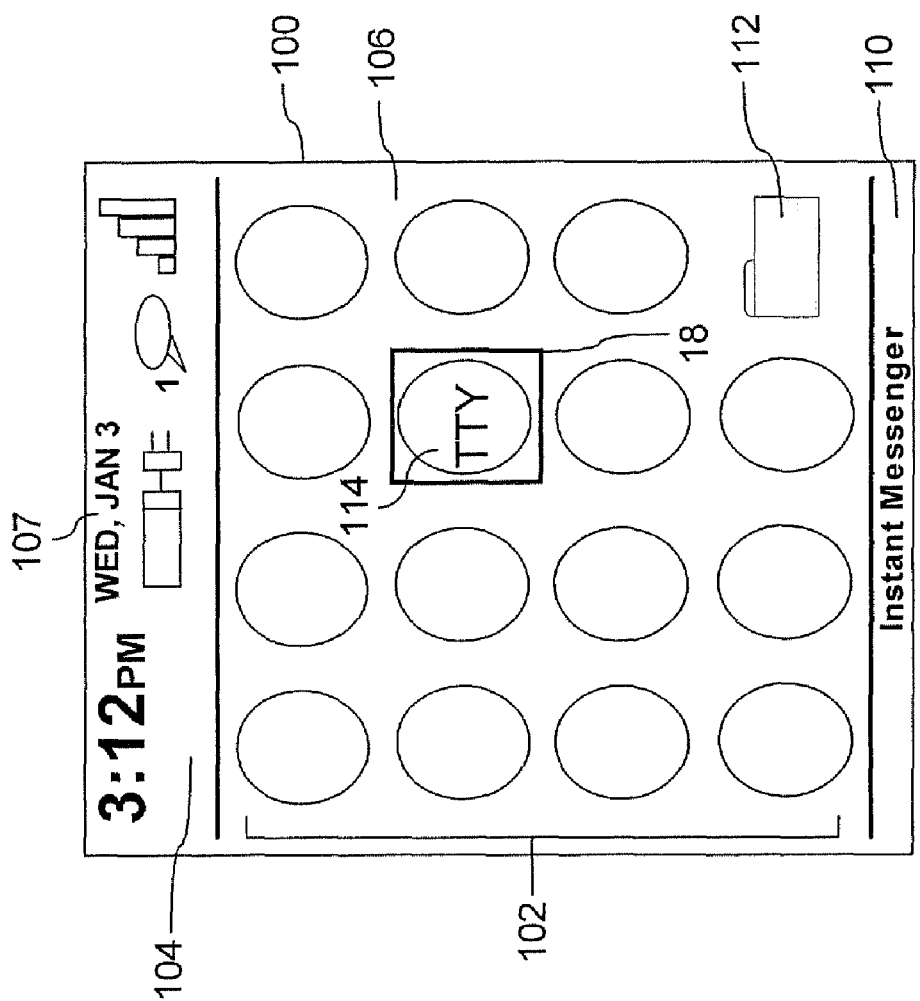
FIG. 5 is a screen shot of a home screen for the mobile device of any or both of FIGS. 1 and 2.

Turning now to FIG. 5, the mobile device 10 displays a home screen 100, which is preferably the active screen when the mobile device 10 is powered up and constitutes the main ribbon application. The home screen 100 generally comprises a status region 104 and a theme background 106, which provides a graphical background for the display 12. The theme background 106 displays a series of icons 102 in a predefined arrangement on a graphical background. Typically, an icon in the series of icons 102 corresponds to an application in applications 80.

In some themes, the home screen 100 may limit the series of icons 102 shown on the home screen 100 so as to not detract from the theme background 106, particularly where the background 106 is chosen for aesthetic reasons. The theme background 106 shown in FIG. 5 provides a grid of icons. In other themes (not shown), a limited list of icons may be displayed in a column (or row) on the home screen along one portion of the display 12. In yet another theme, the entire list of icons may be listed in a continuous row along one side of the home screen 100 on the display 12 enabling the user to scroll through the list while maintaining a limited number of currently visible icons on the display 12. In yet another theme (not shown), metadata may be displayed with each of a limited number of icons shown on the home screen. For example, the next two appointments in the user's calendar may be accessed by the processor 64 (shown in FIG. 3) and displayed next to the calendar icon. It will be appreciated that preferably several themes are available for the user to select and that any applicable arrangement may be used.

One or more of the series of icons 102 is typically a folder 112 that itself is capable of organizing any number of applications 80 therewithin.

The status region 104 in this embodiment comprises a date/time display 107. The theme background 106, in addition to a graphical background and the series of icons 102, also comprises a status bar 110. The status bar 110 provides information to the user based on the location of the selection cursor 18, e.g. by displaying a name for the icon 102 that is currently highlighted.

Accordingly, an application, such as a TTY application 88 may be initiated (opened or viewed) from display 12 by highlighting a TTY icon 114 using the positioning device 14 and providing a suitable user input to the mobile device 10. For example, TTY application 88 may be initiated by moving the positioning device 14 such that the contacts icon 114 is highlighted as shown in FIG. 5, and providing a selection input, e.g. by pressing the trackball 14b.

Figure 6:
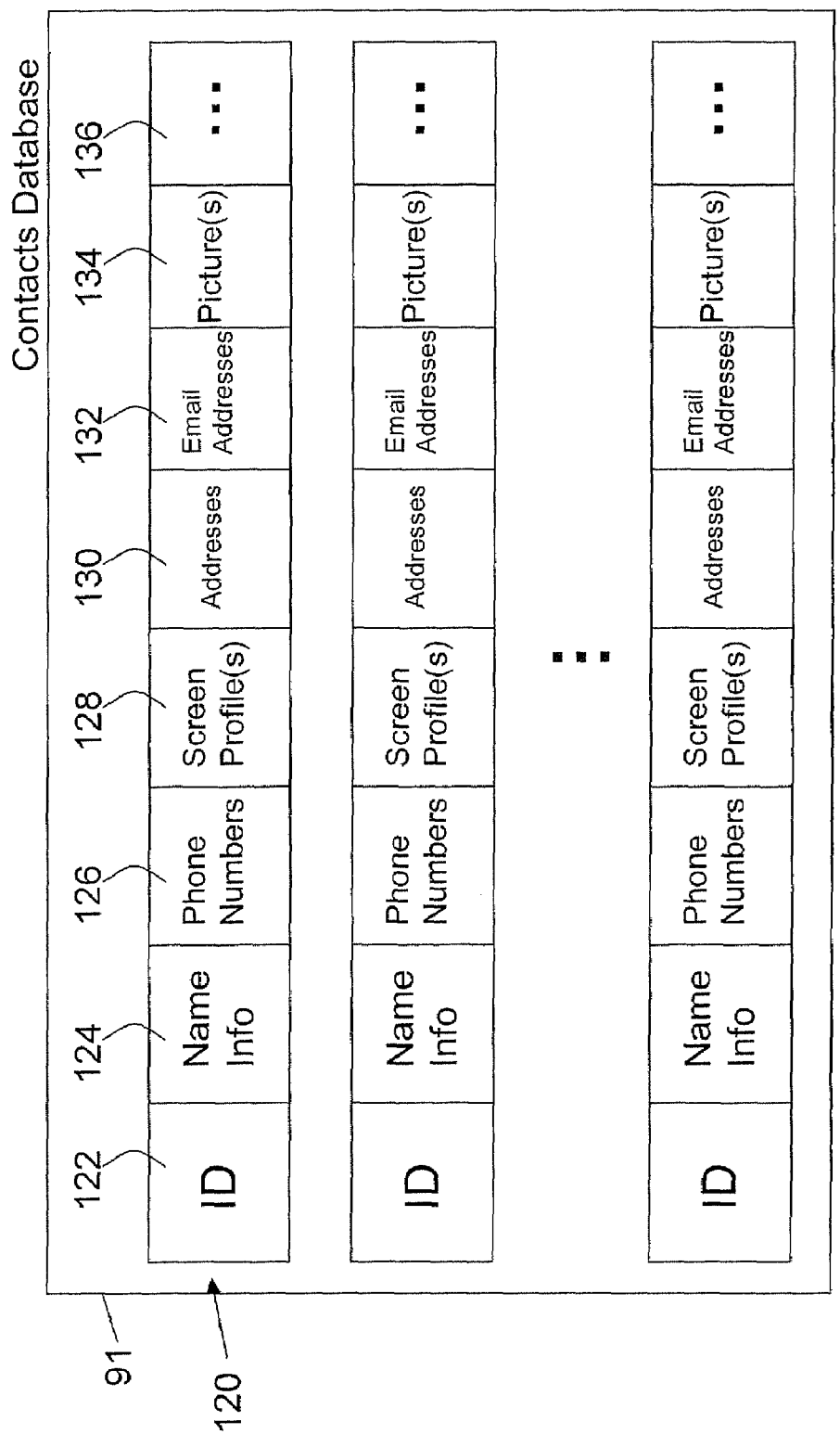
FIG. 6 is a block diagram of a memory for storing contact information.

As noted above, the address book 90 has associated therewith, a contacts database 91 to store data and information corresponding to the contacts listed in the user's address book 90. FIG. 6 illustrates an embodiment of the contacts database 91 to illustrate examples of the types of data associated with a contact. It will be appreciated that the format and structure shown in FIG. 6 is for illustrative purposes only and that any database structure or storage scheme can be used. Each contact is associated with an entry 120 in the contacts database 91. Each entry 120 comprises one or more types of data, information, or associated files (e.g. audio, video) that can in some way be associated with or identify the user of the mobile device 10.

In the example shown in FIG. 6, each entry contains a memory allocation for an identifier (ID) 122 to enable the database to search, sort and filter etc.; name information 124, which may include given names, surnames, common names, nicknames etc.; phone numbers 126, which typically include home, work, and mobile numbers as well as fax numbers etc.; screen profile(s) 128, which are related to user preferences such as screen names, colours, backgrounds, ring tones etc.; addresses 130 such as mailing addresses at home and work; email addresses 132, typically for home, work, school, etc.; picture(s) 134, which are used to visually identify a contact; and any other information, data or files 136 that are stored or yet to be stored (i.e. memory allocation) with the entry 120. The information, data and files in each entry 120 can be added or swapped by editing the entry 120 through the address book 90, which is a common feature on mobile devices 10. Hereinafter, anything in the contacts database 91 that is associated with a contact may be referred to as a data or data element. It can be seen that the contacts database 91 can comprise many different contextual identifiers or data for each contact in a user's address book 90. It is these existing identifiers which can be used to display to the user, better information concerning the caller associated with an incoming call, in particular by using a picture from the contacts database 91. This is especially beneficial for users with cognitive impairments or memory impairments or both, and who utilize the TTY application 88 that is native to the mobile device 10.

Figure 7:
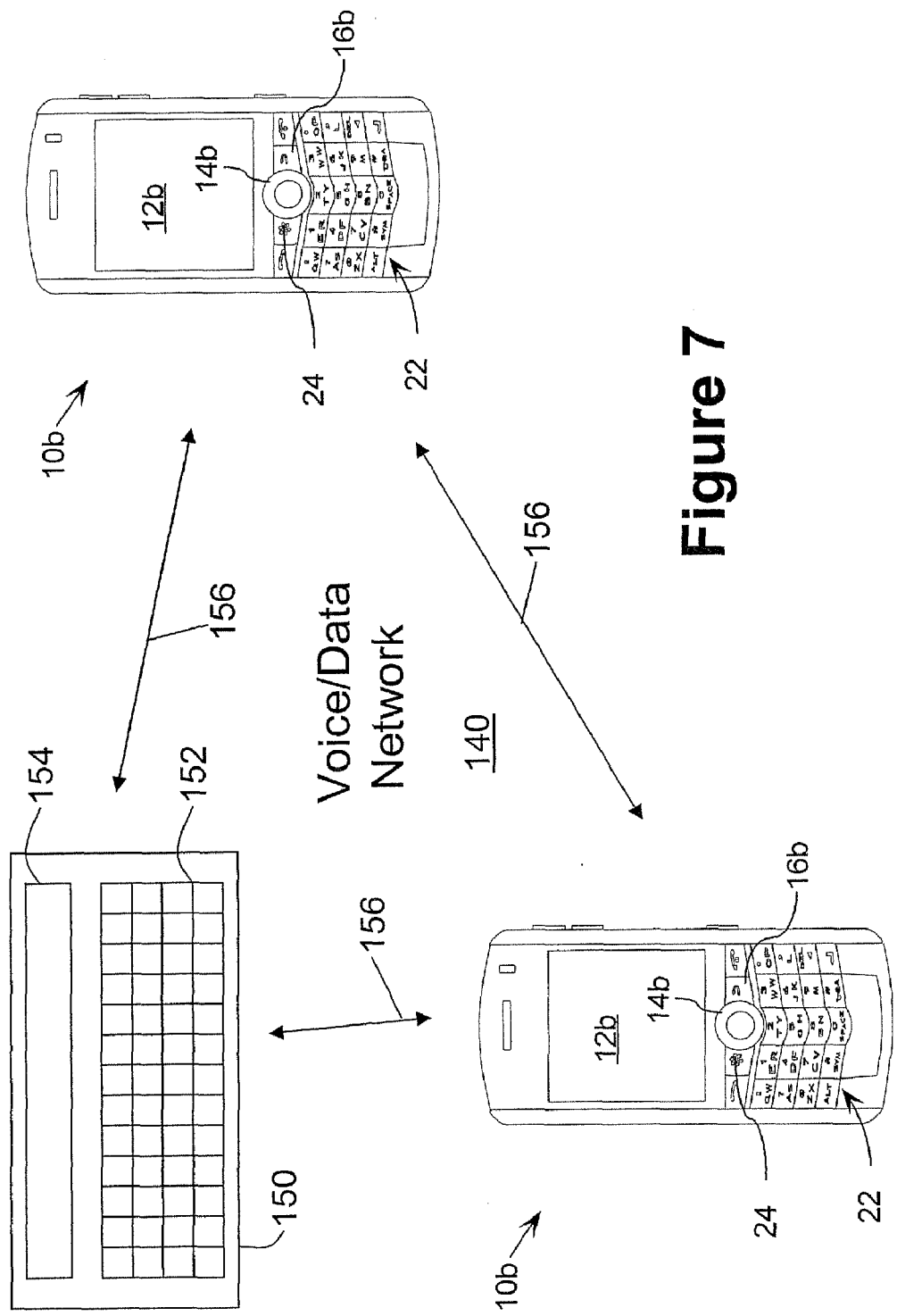
FIG. 7 is a schematic diagram showing communications between mobile devices and a TTY device.

Turning now to FIG. 7, it can be appreciated that the TTY application 88, when installed on the mobile device 10, can enable a TTY user to communicate in a TTY call. A TTY call in general includes a exchange of incoming and outgoing TTY transmissions each having text associated therewith. A TTY call may also be referred to as a TTY exchange or "conversation". The TTY application 88 is configured to enable the mobile device 10 to participate in a TTY call by providing a first communication line configured to receive TTY calls without requiring additional equipment or a traditional TTY machine 150. A TTY user will hereinafter refer generally to a user with a hearing or speech impairment who would traditionally use a TTY machine 150 as a result of their impairment. The TTY application 88 enables a user to communicate not only with other mobile devices 10 over a voice or data or both network 140, but also with traditional, external TTY machines 150 as shown in FIG. 7. This enables TTY users to extend TTY use to a mobile device 10 as well as enabling family, colleagues, friends and others to communicate with a TTY user.

As can be seen in FIG. 7, the external TTY machine 150 includes a keyboard 152 and display 154. The display 154 is inherently limited as it typically can only display up to 1 or 2 lines and the incoming and outgoing messages are contiguous requiring the users to use codes such as "GA" (go ahead) to indicate when a message is completed. Also, traditional displays 154 for TTY machines 150 typically display incoming text messages in the same way as outgoing text messages and do not distinguish between incoming and outgoing messages. As will be explained in detail below, the TTY application 88 utilizes the existing features provided by the mobile device 10 to enhance the TTY conversation experience for TTY users.

The TTY application 88 typically has several features available for TTY-type communications. The following discusses the modes supported by the TTY application 88 in one embodiment. A traditional TTY communication, i.e. a TTY text communication is supported, which sends a TTY transmission 156 over a voice channel in the network 140 with either another mobile device 10 that is also running a TTY application 88, or with a traditional, external TTY machine 150.

A voice carry-over mode is also supported, which enables hearing impaired users with unaffected speech to communicate via voice for outgoing communications, and receive responses by the other party via text (i.e. an incoming TTY transmission 156). In the voice carry-over mode, the TTY application 88 causes the mobile device 10 to accept the user's voice via the microphone 62 and allow the voice input to be sent over the voice channel (i.e. through network 140) unmodified. In this mode, the TTY application 88 may also cause the mobile device 10 to set the state of the speaker 60 to "mute" since the user does not have hearing. Similarly, since the user is sending outgoing messages via voice and is not typing, the mobile device 10 does not need to accept incoming keystrokes at the keyboard 58. The TTY application 88 also causes the mobile device 10 to receive incoming text messages and display on screen through the display component 48 and display 12. It will be appreciated that this mode should only be used when the other member of the conversation has the ability to hear, since they will receive messages via voice only.

A hearing carry-over mode is also supported, which enables speech impaired users with unaffected hearing to communicate via text for outgoing messages (i.e. an outgoing TTY transmission 156), and hear incoming responses spoken by the other party. In this mode, the TTY application 88 causes the mobile device 10 to enable the keyboard module 58 and accept keystrokes entered at the keyboard 20, 22 for outgoing communications. In this mode, the TTY application 88 also causes the mobile device 10 to set the microphone 62 to mute as the user does not have speech, and to accept incoming voice and output same via the speaker 60. In this mode, it is not necessary to have the mobile device 10 display incoming text on the display 12 as this mode enables the user to utilize their hearing for incoming messages via audio.

It can therefore be seen that both text-to-speech and speech-to-text configurations can be used to accommodate different disabilities.

In addition to the modes described above, the TTY application 88 may also include several user interface customization options, which will be explained in greater detail below. Such options may include color-coded onscreen conversations, optional incoming and outgoing font and color settings, a choice between instant messaging-style and traditional TTY-style line displays during the conversation, and user screen name options. Also, as particularly useful for users with cognitive and memory impairments or both, an option is provided that displays a picture 134 for the caller, when the caller is identified in the address book 90. The TTY application 88 also enables a user to save the text of a conversation in the messages storage 92 so that they may be viewed and examined at a later time. Any one or more of these features can be selected by the user through an interface for the TTY application 88 that is initiated by selecting the TTY icon 114.

Figure 8:
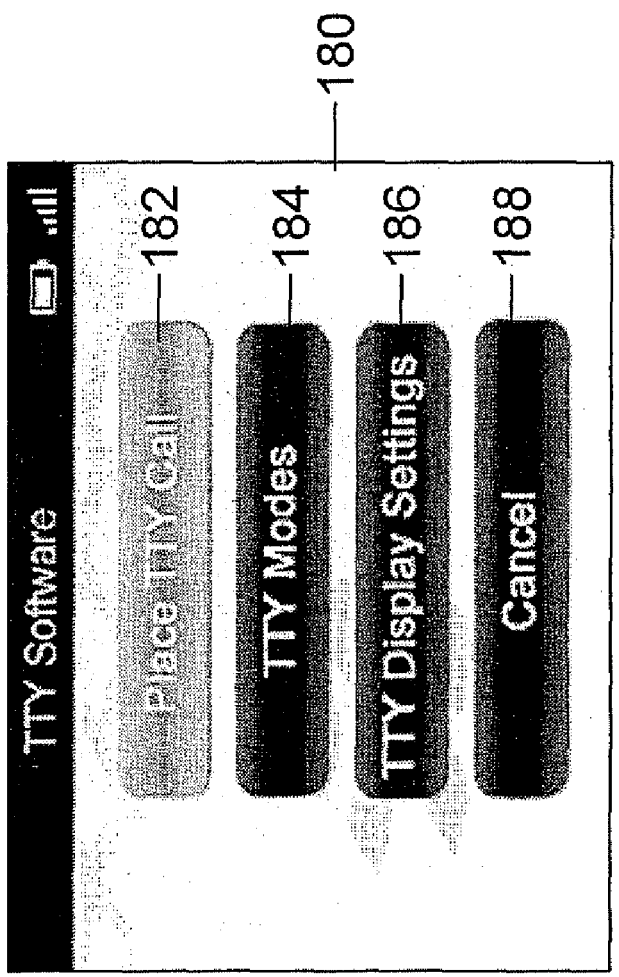
FIG. 8 is a screen shot showing a TTY application interface menu.

Referring now to FIGS. 8-13, example embodiments of a user interface for the TTY application 88 is shown. FIG. 8 shows a screen shot of a menu 180 displayed when the TTY application 88 is initiated by the user. The menu 180 comprises four options, a first option 182 to initiate or "place" a TTY call, a second option 184 to set or configure the TTY modes (modes described above), a third option 186 for setting, configuring or editing TTY display settings, and a fourth option 188 for exiting or closing down the TTY application 88.

Turning now to FIG. 9, a display menu 200 is shown, which is initiated by the user selecting the third option TTY Display Settings 186 in the menu 180 (shown in FIG. 8). The display menu 200 provides a number of font options 202 to allow the user to specify font types, font sizes (point sizes), font styles (typefaces), case (lower or upper), greyscale, shading, underlining, italicizing, bolding, and colors (either colors of the type, or, background colors) for both incoming and outgoing text. This is a particularly useful option for distinguishing between the user and the caller since the user can assign different fonts, colours and styles to the text that the user has typed and the text that has been sent by the caller. The display menu 200 also includes a preview pane 204 that displays to the user how the text would appear if the selected font options 202 are applied. The display menu 200 also enables the user to specify whether or not conversations should be saved to the messages storage 92 by providing a Save conversations option 206. It will be appreciated that a conversation includes record of incoming and outgoing text messages sent during a TTY call to a particular recipient. Any saved TTY conversations can be retrieved and include the text of the TTY conversation, similar to short-message-service (SMS) messages.

The user can also select between different window styles by modifying a Message window style option 208. A Set Screen Name button 210 is also included, which enables the user to select, or enter a particular screen name as shown in FIG. 10. By selecting the Set Screen Name button 210, an input box 212 is displayed directly in the menu 200 that provides the user with the opportunity to enter a preferred screen name to be displayed in conversations.

Figures 11, 12:
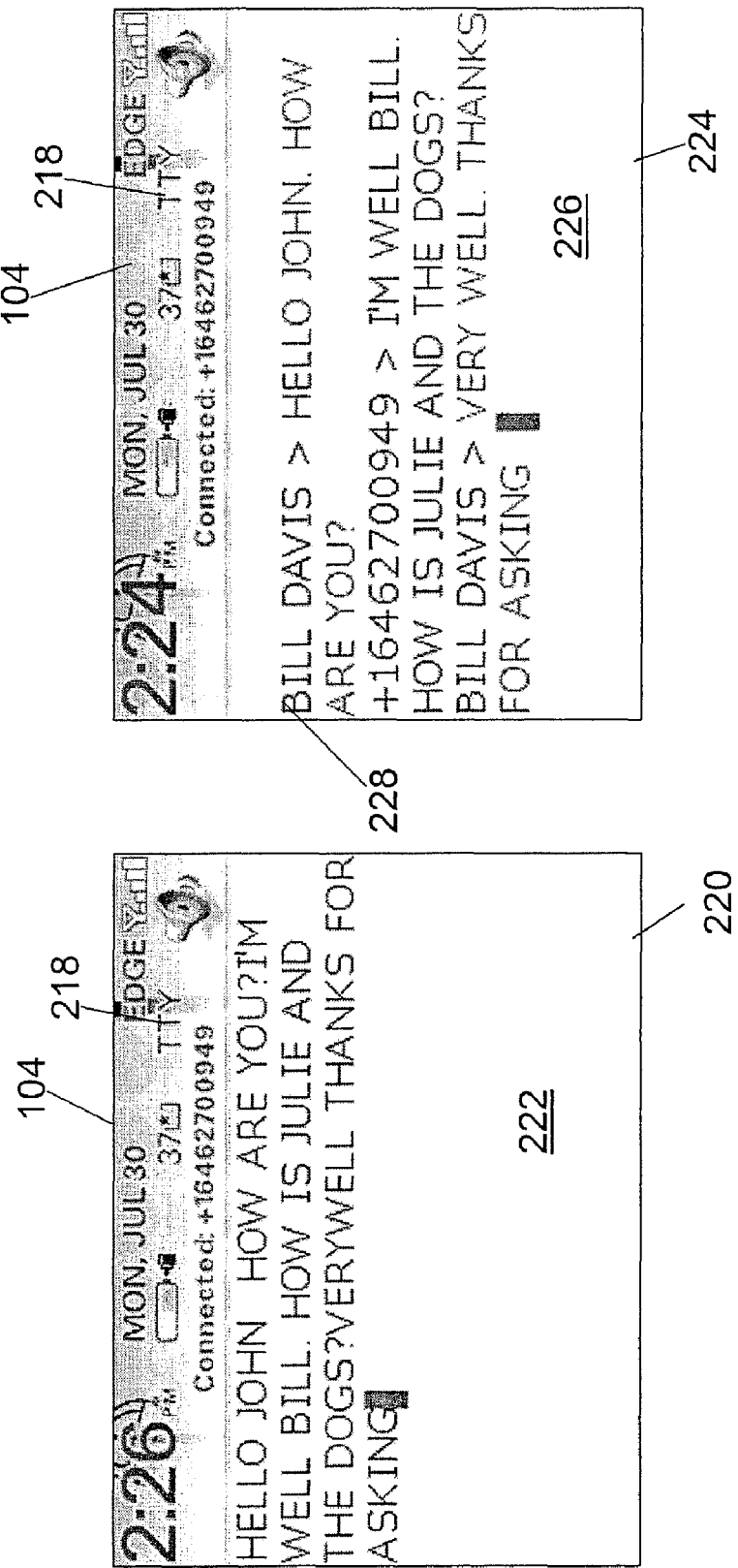
FIG. 11 is a screen shot showing a TTY conversation interface in one example embodiment.
FIG. 12 is a screen shot showing a TTY conversation interface in another example embodiment.

FIGS. 11 and 12 show two message window styles that can be selected by the user. FIG. 11 shows a basic TTY style window 220, which displays conversation text 222 as it would appear on an external TTY machine 150 but displayed over a number of text lines rather than only 1 or 2 text lines typically provided by the traditional TTY display 154 (shown in FIG. 7). As can be appreciated, the font options 202 (shown in FIG. 9) can be tailored to the TTY style window 220 such that different font styles, colours etc. can be used to help distinguish between incoming and outgoing text messages. When compared to a traditional TTY display 154 (shown in FIG. 7), the font options 202 alone can greatly increase the usability of the TTY application 88 since the user is not limited to the traditional TTY-style output, which can be difficult to read. For example, incoming text message could be set to be blue and be displayed in all uppercase letters while outgoing text, although sent according to a normal TTY protocol, could be shown on the mobile device 10 in red font and all lowercase letters. In this way, both during the conversation and upon later review (if conversation is saved), the user can immediately ascertain which correspondent provided what text.

FIG. 12 shows an instant messaging (IM) style window 224, which displays conversation text 226 in a manner that is similar to traditional instant messaging applications. In the IM style window 224, the incoming and outgoing messages are separated by line breaks, and name identifiers 228 are used to indicate which party said what. It will be appreciated that in order to display the conversation text 226 as shown in FIG. 12, the TTY text would need to be examined and transitions detected to ensure that the line breaks are placed in the appropriate spot. This can be determined based on timing such that when the mobile device 10 is sending characters but not receiving characters, that user is the current speaker, whereas if the mobile device 10 is receiving characters but not sending characters, they are the current listener or recipient. Other cues may also be used to detect speaker changes. For example, the TTY application 88 can be configured to look for spaces between words so as to ensure that if one speaker cuts off the other speaker, the wrong text is not inserted into the middle of a word. This can be done by continuing to collect characters and treat them as a single word until a received space is determined. In other words, the TTY application 88, when detecting characters to be sent, first determines whether characters are still being received and if possible, whether a space or other cue is detected before displaying a line break on the display 12.

The colour coding, font attributes etc can also be used to further distinguish between the incoming and outgoing messages. The name identifiers 228 are preferably taken from the user-specified screen name for outgoing messages, and taken from the name information 124 that is associated with the phone number 126 identified when the call is incoming. As such, not only is the text clear and distinguishable, the contacts database 91 is used to take advantage of identifiable data or information regarding the calling party to assist the TTY user, which is particularly useful where the user has cognitive and memory or both impairments. As discussed above, the contacts database 91 enables the TTY application 88 to add context to the TTY conversation and better identify and distinguish between the parties.

Figure 13:
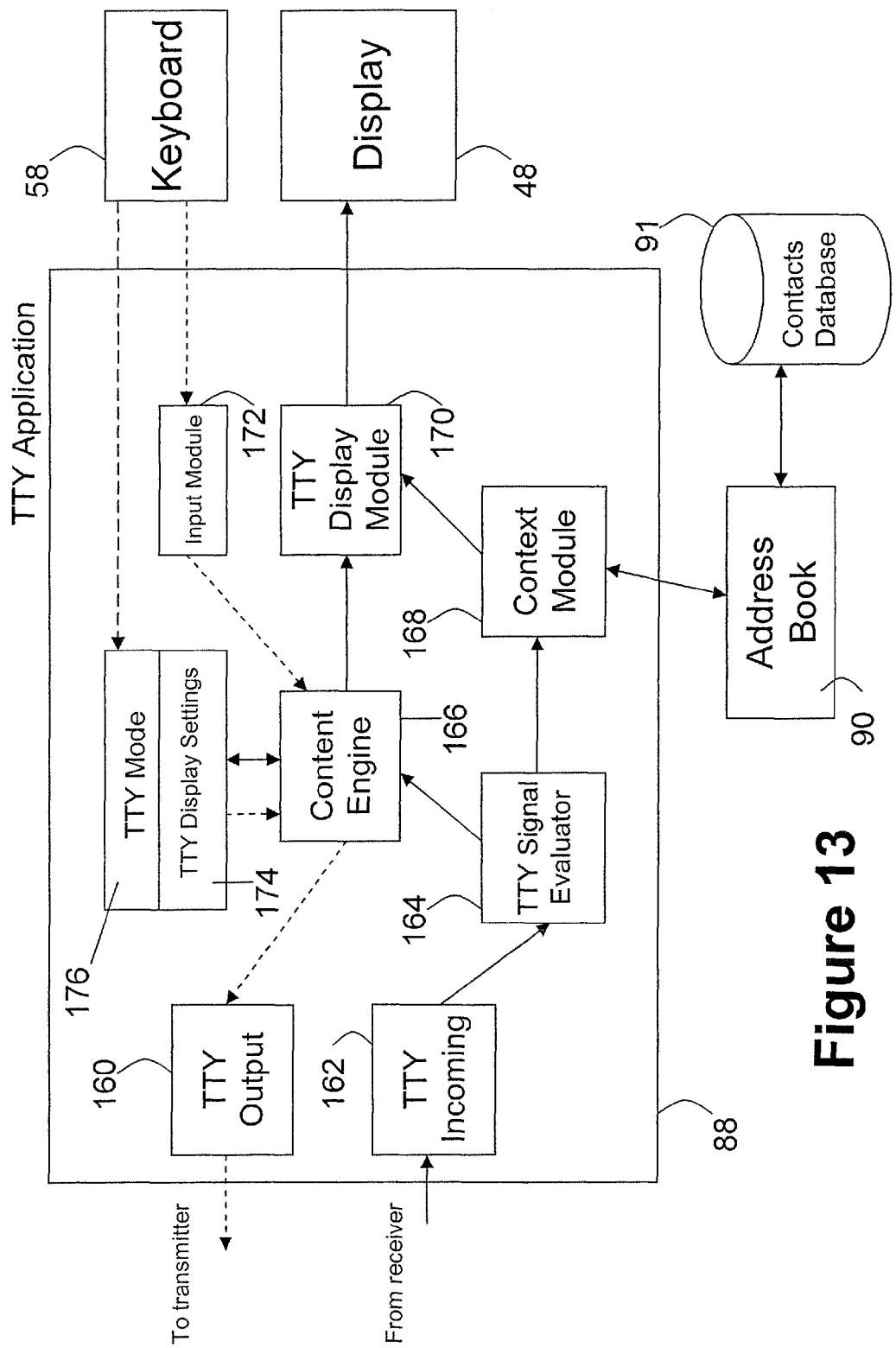
FIG. 13 is a schematic functional block diagram of a TTY application for a mobile device.

FIG. 13 shows a functional block diagram of the TTY application 88. It will be appreciated that the functional blocks shown in FIG. 13 are intended only to illustrate features of the TTY application 88 and any one or more of the functional blocks could be implemented together or in further-separated modules when embodied as computer executable instructions. The TTY application 88 is programmed and configured to receive incoming TTY transmissions 156 from the receiver 36 of the mobile device 10 and to receive inputs from the user entered on the keyboard 20, 22 via the keyboard module 58. The TTY application 88 is also configured to provide outgoing TTY transmissions 156 to the transmitter 40, which include messages entered or provided to the mobile device 10 by the user, and to provide display data in a particular format to the display module 48 to be displayed on the display 12. The TTY application also references the address book 90 to query and extract information regarding the other party in the conversation from the contacts database 91. In FIG. 13, the solid arrows correspond to data flow for incoming TTY transmissions 156, and dashed arrows correspond to data flow for outgoing TTY transmissions 156.

TTY transmissions 156 that are received from the receiver 36 are accepted by a TTY incoming module 162 and TTY transmissions 156 that are sent to the transmitter 40 are done so by a TTY outgoing module 160, each of which are configured to process TTY transmissions 156 and if necessary, evaluate incoming radio signals and recognize those that are for TTY conversations. Incoming TTY transmissions 156 are further processed by a TTY signal evaluator 164 that extracts the text or message content from the transmission 156, which is then passed to a content engine 166. The TTY signal evaluator 164 can be configured to examine incoming and outgoing TTY transmissions associated with a TTY call and determine an identifier in the TTY transmission associated with a respective correspondent that can be used to identify that correspondent by modifying the content shown on the display 12. The content engine 166 prepares the TTY message (both for incoming and outgoing messages) from the text according to the TTY display settings 174 and the TTY mode 176. It will be appreciated that the content engine 166 may be also be configured for determining the identifiers in the incoming and outgoing TTY transmissions.

The TTY message is then provided to a TTY display module 170 which is responsible for preparing and outputting the TTY interface (see FIGS. 11, 12 and 15). The TTY signal evaluator 164 also sends the phone number or any other identifying data or information associated with and which can be extracted from the incoming or outgoing TTY transmission 156 to a context module 168. In one example, for incoming TTY transmissions 156, the context module 168 uses the information provided by the TTY signal evaluator 164 to reference the address book 90 and determine whether or not the incoming call can be associated with one of the user's contacts. If so, contextual elements or data that are related to the contact are extracted from the contacts database 91, e.g. a picture, screen name or nickname, colours etc. The context module 168 then provides any such contextual elements to the TTY display module 170 so that they may be included with the message content in the TTY interface.

When an incoming TTY transmission 156 is processed by the TTY incoming module 162, an incoming call screen 230 is first displayed by the mobile device 10 as shown in FIG. 14. The incoming call screen 230 includes a status bar 232 to indicate what is happening and a selection bar 234, which includes a first option 236 to answer the incoming call, and a second option 238 to ignore the incoming call. To assist the user, especially those with cognitive and memory impairments, with the decision as to whether or not the call should be accepted, the contextual elements are also displayed in the incoming call screen 230. In this example, the user's name 124 is displayed (FRIEND), along with the phone number 126 being called from, and a picture 134 of the user. The name 124 and picture 134 are, as explained above, extracted from the contacts database 91 according to the incoming number 126. It will be appreciated that other data or information such as an ID 122 may instead be used to search the contacts database 91 if such information is sent with the TTY transmission 156. Also, other identifying features such as colour and font can be applied to the incoming call screen 230 to further assist the user in recognizing the caller. It will be appreciated that any one or more data or data elements associated with the caller or other party can be displayed to the user, e.g. picture only, name and picture, number and picture etc.

If the call is accepted by the user, a TTY conversation window is initiated. The embodiments shown in FIGS. 11 and 12 may be used, or the embodiment shown in FIG. 15, which utilizes the same contextual elements as shown in FIG. 14. Turning now to FIG. 15, the picture 134, name 124 and number 126 can be displayed within the context-type window 250, between the status portion 104 of the display 12 and a conversation sub-window 252. The conversation sub-window 252 preferably enables multi-line IM style messaging and may utilize the font styles and colours described above. For those users with cognitive and memory impairments, the multitude of visual cues on the screen will assist in the user recognizing the caller and maintaining this recognition throughout the conversation by simply referencing the contextual information.

Accordingly, existing contact information stored in a mobile device can be utilized to provide the TTY application 88 with display features that can assist users with cognitive impairments in associating an incoming call with a particular caller. By parsing a locally stored contact database on the mobile device 10, the user can be presented one or more identifiers, in particular the picture 134 that is associated with the contact entry 120. The picture, in combination with name 124, number 126 and predetermined font and other display features enables users with memory and/or cognitive impairments to better associate a phone number 126 to a person.

For people with cognitive impairments, the ability to conduct critical reasoning is further facilitated with an incoming call screen 230 (as well as the conversation screen 250) that includes, in particular, the picture 134 from the contact database 91 referenced by the address book 90. This is because the user can choose to accept or deny an incoming call based on either picture 134 alone, phone number 126 alone, name 124 alone or any combination of two or more of these contextual elements. This added functionality can decrease user error, increase the speed by which users can process the incoming call, and generally adds to the overall user experience. It will be appreciated that the enhanced display features discussed above can also be applied to regular telephony facilitated by the mobile device 10 and need not be limited only to TTY communications.

Figure 16:
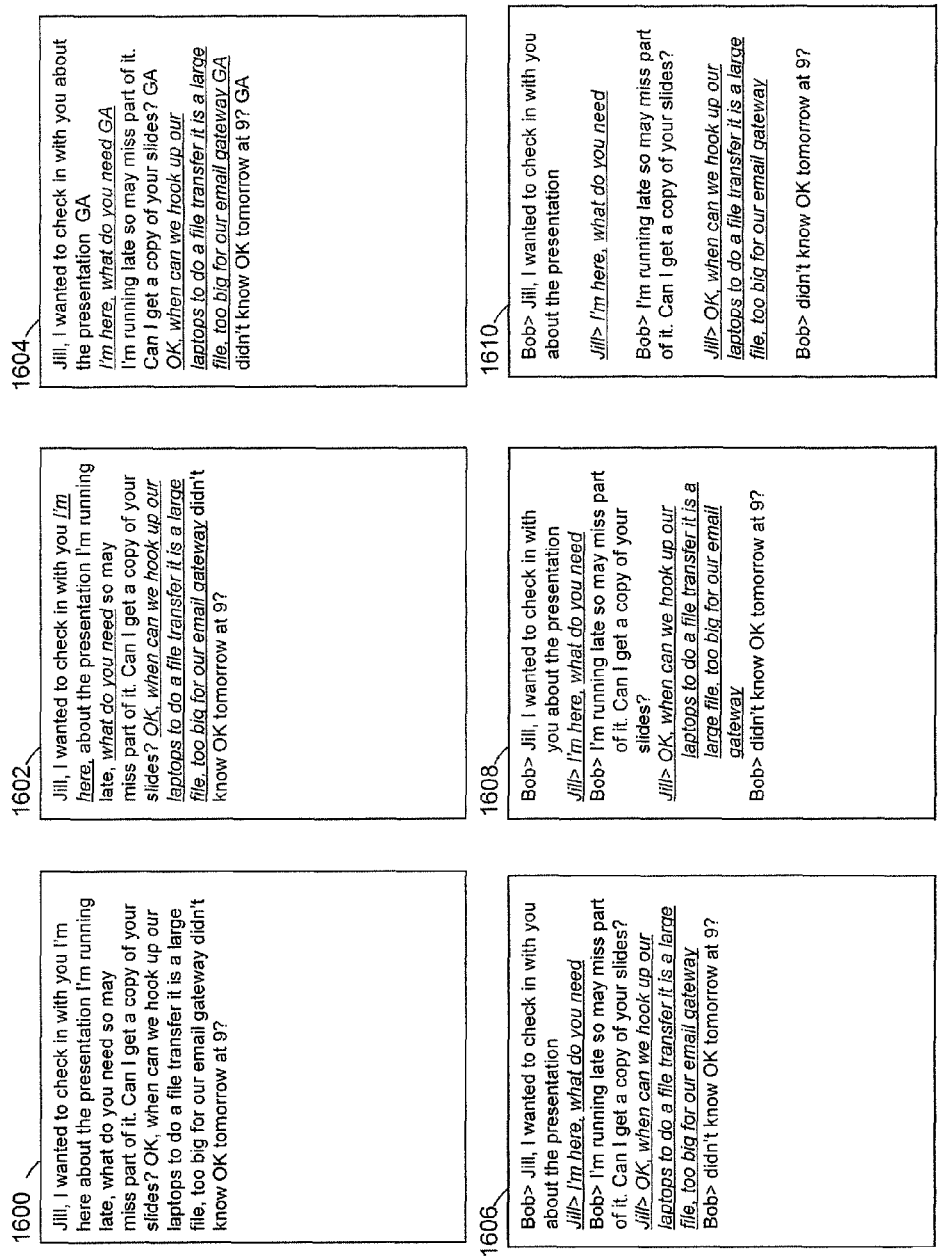
FIG. 16 is an illustrative set of TTY display styles/modes.

Focusing on visually enhancing, or identifying, conversational flow and passive and active flow control, FIG. 16 shows a set of visual types or modes. The use of "flow control" in this disclosure means any programmable or settable or detectable method or code or hardware that when used by the TTY device as it is running (in use), would enable code or a program being executing to affect the display of TTY text in a manner that is visually detectable and is intended visually disambiguate character streams from two sources. The result is that two character streams (sequences of characters, displayable on the UI, from two sources) are displayed so as to be visually distinguishable from each other. Note that although the descriptions focus primarily on screen displays, this concepts disclosed herein also apply to printing (hardcopy) devices as far as generating/using visually distinguishable printed character streams are concerned.

The syntax shown in these figures is different from what would typically be seen between two people deaf since childbirth; the figures are only to illustrate textual visual distinctions and conversational flow control concepts.

FIG. 1600 illustrates no visual enhancement associated with text string (character string) display. This is similar to FIG. 11. The character streams originating from each user is displayed as received from either user on the TTY device. This includes both remotely originated characters including OTA (over the air) reception, and, characters input on the local TTY device. The result is a display that is very difficult to read or visually decipher. Without the two participants using a TTY-friendly communications style, the two character streams will be intermixed and the display unreadable. TTY-friendly communication styles used by users includes stopping after typing "GA" (go ahead) and waiting for a next set of characters to be received from the other participant, together with an indication of when the other participant is finished using a "GA" or similar indicator. Traditionally, TTY users have used "GA" to indicate they are finished typing and are ready to receive, "SK" (stop key) to indicate a stopping point, and "SKSK" to indicate the end of a conversation.

FIG. 1602 illustrates a visual enhancement to the display of the character streams, but still with no flow control. Shown are some characters strings in plain text, while another set of characters are underlined and italicized. This is just for illustrative purposes. Any visual means for distinguishing the two character streams may be used; options and the setting of this type of option is discussed elsewhere in this disclosure. Although there is no flow control, having the two character streams visually differentiable enables users of the TTY device to distinguish between the two character streams if they become intermixed. A user may then read either one of the other of the text types. This enables the user to more quickly re-read one stream or the other, or, know where he/she is in the conversation if one person accidently (or purposefully) talks over the other person.

FIG. 1604 illustrates a screen when the visual distinctions discussed for FIG. 1602 are combined with TTY-friendly communications. Although dependent on the two users to control their communications styles to one for TTY-friendliness, it results in a screen display where the two sides of the conversation become very visually distinct.

FIG. 1606 illustrates a display where the TTY device adds a display mode. The TTY device keeps track of the source of each character or character string (a single character is a character string of length 1). This may be done using the fact that each character string comes from either a local source (for example, a keypad) or is received by the device from an outside source (received over a telecommunications network). The two sets of input can be associated with an indicator. In its simplest form, the indicator may be a single bit, used to create a visual distinction on the display when detected with the character string (ex: FIG. 1602). It is expected that the more popular embodiment will associate a character string with a phone number or ID. The ID will have a phone number associated with it, to allow the ID to be located when an incoming or outgoing call is made using it. In some embodiments there will be an name associated with the telephone number or ID, or, or default display ID. A typical default display ID will be the phone number itself, if no name is found with the ID. These associations may be kept in an address book application, may also be kept in a dedicated piece of software that only does this one task, may be kept in a fully optioned PIM (Personal Information Manager) application, or, any other embodiment with the associability functionality.

In addition to identifying characters with a source or ID, shown in FIG. 1606 is a screen resulting from a passive form of flow control. Passive flow control refers to any type of flow control used to distinguish different character streams originating from two sources, where the flow control is not actively input by the users. This includes the methods described earlier in this application, such as detecting the passage of an amount of time when no new characters are received from a source, indicating that the source has reached what will be interpreted by the TTY device as a logical stopping point for the purposes of displaying the text on a screen. Part of flow control may be the use of internal buffers, used to temporarily store incoming characters until they are to be displayed.

When displayed, each character string will be visually distinguished preferably using an indicator at the beginning of the string. Note that due to the size of the display, it may well be that a single character string with its indicator may be longer than a single line on the display. The character string will then be displayed over several lines, until the entire string is on the display. In one embodiment, only the first line will start with the source indicator (i.e., a name); in another embodiment the source indicator may be used at the head of each line. The text from the local source may or may not use a beginning-of-line source indicator. It is expected that most embodiments will use some kind of indicator for local text, even if it is very abbreviated (i.e, a single letter, "Me", or some other shorthand), to visually distinguish character strings that use multiple lines of text on the display. In some embodiments this will be a settable parameter by the user.

FIGS. 1608 and 1610 show further embodiments usable to visually distinguish participants in a TTY conversation. FIG. 1608 illustrates the use if indentation, making the line labels (source indicators) readily apparent. FIG. 1610 shows how adding a blank line between each text string allows for quick and easy visual identification of each step in the on-going conversation.

Figure 17:
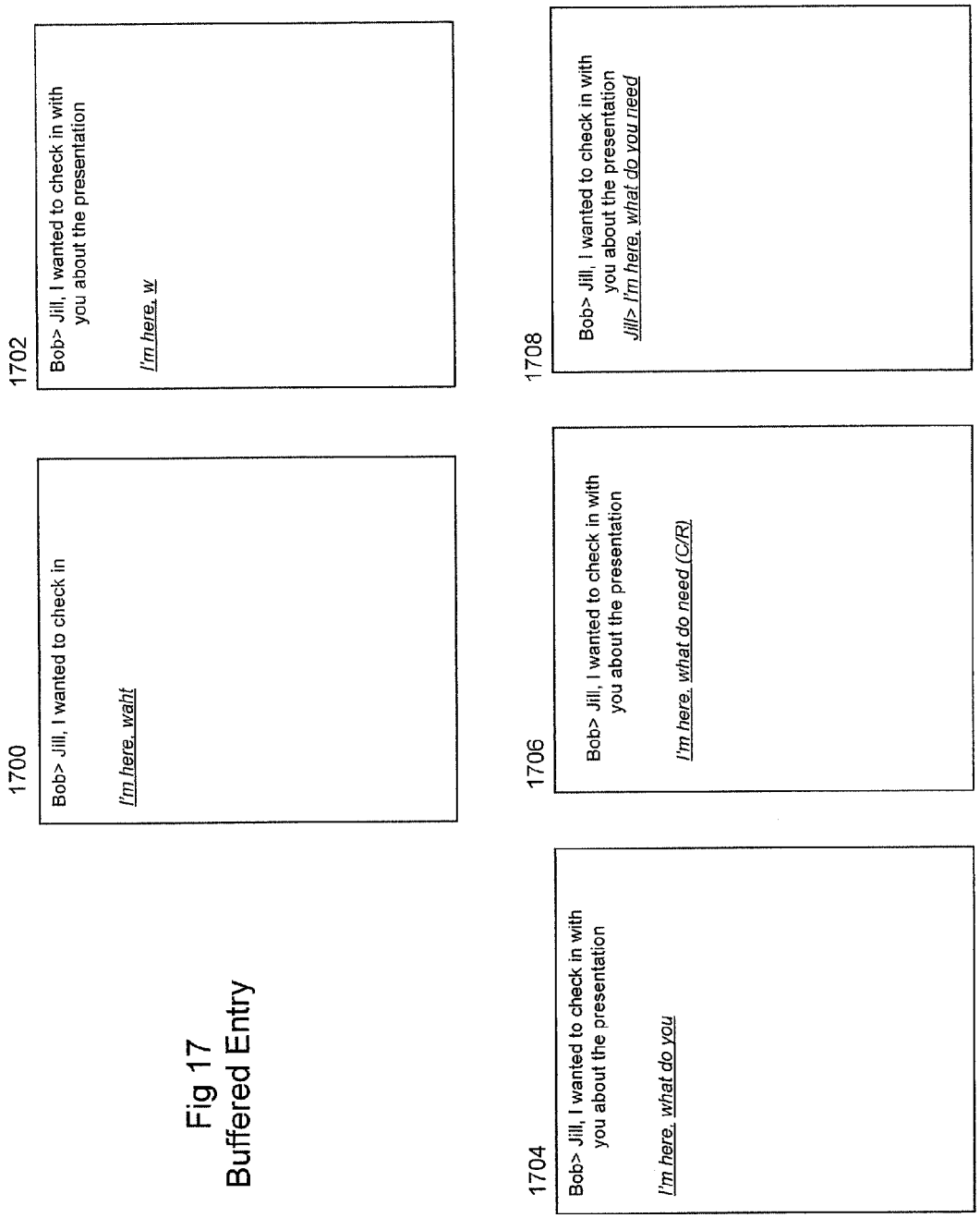
FIG. 17 is a set of illustrations showing buffered text entry.

Continuing with FIG. 17, illustrated is an embodiment which uses a single screen with several blank lines after the last line of displayed text (visible to both parties) and a display buffer. The text (character string) in the buffer has not been sent, and is only visible locally. This is further indicated by the fact that there is no line header (source identifier) at the beginning of the line. FIG. 1700 illustrates a stage where Bob is sending a character string, and, Jill has started to enter text in her local buffer (her characters are not being sent).

FIG. 1702 shows a continuation of the process, where Bob has continued to type text, which is being displayed, while Jill continues by editing her previously entered text (she deleted some letters). In FIG. 1704, Jill notices that Bill's text has stopped, indicating he is waiting for a response. Jill has also entered more text in her local buffer, but is not yet ready to send. FIG. 1706 shows no more text has been added by Bob, and, Jill has indicated that the text in her local buffer is ready to send by entering carriage return (C/R). Use of a C/R is a form of active flow control, that is, flow control indicators entered at the UI and received by the TTY device from the UI. Upon detecting the entry of C/R, Jill's TTY screen is shown in FIG. 1708, where her text has been sent to Bob, and, her display shows the text as now seen by both parties by adding a source indicator to the beginning of the character string and moving the string to the messages area of the screen (out of the buffer area). The buffer area is now empty. Presumably, Bob will respond after which Jill will start to enter text. However, Jill is free to start entering local text immediately, which will stay in the buffer area until Jill once more indicates it is to be sent by entering a C/R.

Figure 18:
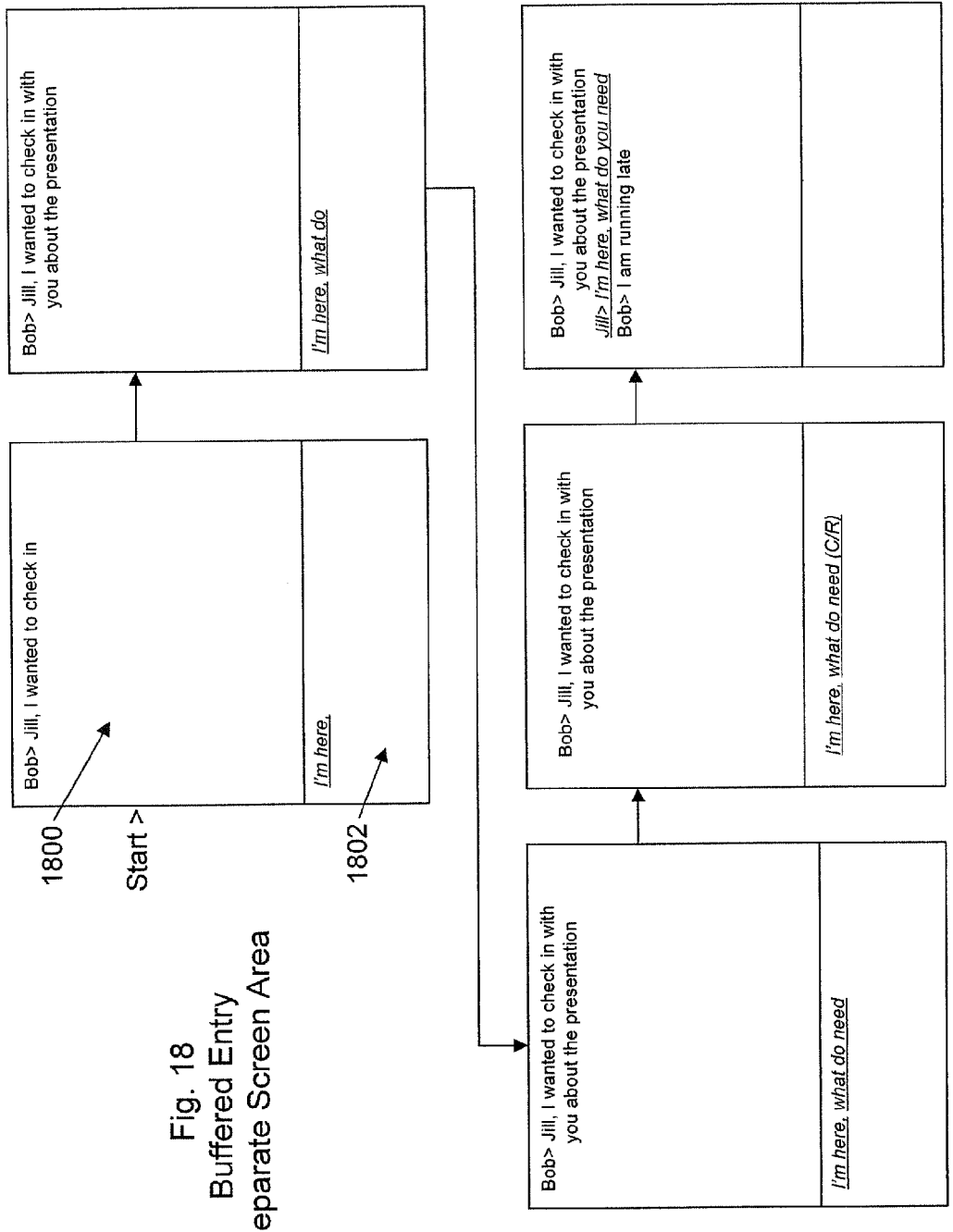
FIG. 18 is a set of illustrations showing split-screen buffered text entry.

FIG. 18 shows a similar sequence as FIG. 17, but with one area 1800 of the screen permanently assigned to display the conversation, and one area 1802 to show buffer contents only. It has the advantage of using the same location on the screen for the buffer (in FIG. 17, the location varies), so the user knows where to look no matter how much text is on the screen. A possible disadvantage is that for some conversations, the buffer area may be under utilized which takes away screen area from the on-going conversation. For descriptions of the individual steps in the conversation, see FIG. 17. Buffered text may also be shown in a different display. How to display buffered text will be a design decision for each TTY device.

Illustrated in FIG. 19 is a flow associated with character stream processing. A character stream means a set of strings of characters originated during the conversation from either party. Some of the character stream will be character strings that originate locally, and some will originate remotely and received over a telecommunications connection. Actions associated with block 1900 include the TTY device receiving a character string, internally or externally. Continuing into block 1902, the TTY device associates a source, origin, or display indicia with the character string. In one embodiment, the TTY device simply associates a bit or several bits (flags, indicators) with the string which is usable to enable the characters to be displayed in a predetermined manner (color, font, size, or any other visually distinguishable feature). In other embodiments a source indicator is kept with the text string, also usable to determine how to display the string.

Continuing to block 1904, the TTY device needs to make a determination of how to display the character string, in accordance with the string's associated ID, flags, bits, or other identifier, and, the TTY device's display mode. Proceeding to decision diamond 1906, two different paths are taken depending on the existence of any flow control. If there is no flow control on this TTY device, the "N" exit is taken to block 1908. The actions associated with 1908 are to display the character string in accordance with any visual characteristics associated with the character string. The characters are displayed without flow control considerations by the TTY device, only using any associated visual characteristics.

If the answer at decision point 1906 is yes, the "Y" exit is taken to decision diamond 1910. Decision diamond 1910 represents actions taken to determine if the TTY device has, or is using, passive flow control or active flow control, as associated with this character stream (note—may apply to all character streams on this TTY device). If the answer is yes, passive flow control is being used, then the "Y" exit is taken to block 1914. The actions associated with block 1914 are a combination of determining if one of the passive flow control heuristics or indictors has been triggered (set), and, using the display characteristics associated with this character string, if any. The TTY device uses the data it has to determine how to display the character string. Numerous options may be made. For example, if a passive flow control indicator has been set, the TTY device may display the character string by first displaying a source indictor at the start of the line, followed by the character string with any associated visual characteristics. If there has been no passive flow control indicator set, the character string may be appended to an existing line. Alternatively, the character string may be stored in a buffer until a passive flow control flag or indicator is set, and at that time the entire contents of the buffer displayed, with the first line having a source indicator at the line's start point.

If, at decision diamond 1910, the answer is no then the "N" exit is taken to block 1912. Actions associated with block 1912 include any taken to process or display the character string in accordance with received active flow control characters or indicators. If no active flow control characters or indicators are detected, and the character string was received locally, one embodiment will store the character string in a buffer area, and display the buffered characters in a designated place viewable by a user. If there were no flow control characters or indicators and the character string originated remotely, one embodiment will append the character string to the last character string from the same source. If the previous character string was displayed, this character string may be appended to the characters already displayed. If the previous character string is being held in a buffer (in one embodiment not visible to a local user), this character string will be appended to the last character string in the buffer. If there had been a control character in the string, non-control characters would have been appended to the those either displayed or in the buffer, and then the display would indicate the message is completed (perhaps by showing a newline indicator visually), or, the buffer contents would then be displayed in a manner consistent with any selected or indicated visual characteristics.

Active flow control uses specially indicated or reserved characters or indicia as flow control directives for the display. Any may be used, and, they may be as complex as desired. In one simple embodiment, there is one active flow control character: carriage return (C/R). When a C/R is detected in the character stream, it causes a corresponding change in the visual display. If the C/R was entered locally, in one embodiment this will cause a local buffer to be sent to the other party, and, to be displayed on the conversational portion of the screen, usually with a source indicator and any applicable visual characteristics. If the C/R is received from a remote source, and the remote character source's character strings are buffered locally, this causes the local buffer to be emptied and displayed, typically using a source indicator and any associated visual characteristics. If the remote source's character strings are not buffered locally, the C/R may cause a newline to be displayed locally, after the presently received character string is appended to the remote source's already existing character sting, if no other newlines have been entered in the interim. Other embodiments may include other flow control characters or character combinations, and, may also use special-purpose buttons or other UI inputs for the purpose.

The actions and descriptions associated with FIG. 19A will typically be a combination of design decisions and implementations for any specific TTY device. For example, a TTY device engineering team may know that its TTY device will not have any passive flow control capabilities. Other TTY devices may have no active flow control capacities. Others may have no flow control capabilities at all. In each case, the design of the TTY device will have taken into consideration portions of the actions or associations which will not be actively programmed into a device, and, other portions will actively programmed. Thus, a fully capable TTY device may have programming that implements decisions on which flow control to use; other less capable devices will simply implement the applicable portion of any decision or action illustrated or described regarding FIG. 19, in accordance with the TTY device's limitations.

FIG. 19B illustrates the setting of flow control modes at the user interface or UI. A UI includes any interface on the TTY device usable for input to the TTY device, or, detectable as output from the TTY device. Block 1916 includes actions needed to invoke, or present, an indication at the UI that the TTY device is ready to accept input that associates a phone number or ID in an application (e.g.: address book, PIM) with a flow control mode. Available flow control modes will be determined by the TTY device. If a TTY device cannot operate in more than one flow control mode, in one embodiment this sequences would not be available at all. If the TTY device can operate in more than one flow control mode, what is possible for the TTY device will be available for selection or association with a phone number or ID. Possible flow control modes are:

(1) No Flow Control (2) Passive Flow Control (TTY Device Determines Flow Control)

(3) Active Flow Control (Input Detected/Received At The UI Of The TTY Device Determines Flow Control)

In some embodiments, a TTY device will have the capability to be operated in each of the three modes. A user of the device may need to interact with people who have TTY devices that span capabilities from no flow control, only one of passive or active controls, or any combination. If the user knows person X has a device that has no flow control, the user may select "no flow control" to be associated with X's phone number so that the user's own TTY device does not misinterpret pauses or other events that actually have nothing to do with the flow of the conversation, and, to not misinterpret characters like C/R which were not intended by user X as an end-of-line or other indication. Further, user Y may have a TTY device that has passive flow control but not active flow control. This user may wish to associate Y's phone number with "passive flow control only" so that this user's device does not misinterpret what would otherwise be active flow control characters coming from Y's TTY device. Other combinations of settings to associate with other devices of varying capabilities will be apparent to practitioners in this field who also have the benefit of the present disclosure. All combinations possible are fully contemplated.

Continuing to block 1918, the user indicates to the TTY device which flow control mode is to be associated with which phone number or ID. This could be accomplished in any way usable at the UI. For example, the user might input, at a designated places on a touch screen, the ID or phone number to be associated with a flow control mode. Alternatively, the user may use a pull down menu or other UI interface to indicate a phone number already in the TTY device. The device then accepts an indication of the mode to associate with this phone number. This may be by any means, such as a pull-down menu, numerical indication, or other input at the UT to indicate a flow control mode.

Continuing to block 1920, the TTY device saves the association using whatever process is appropriate for the application and device. In one embodiment, the TTY device has an address book, which has field usable to store a flow control mode selection with the entry. In another embodiment, there will be an application that is specific to this functionality, and will specifically store a flow control mode with a phone number along with other display characteristics. Whatever method or application is used, the association is stored such that the TTY device can retrieve it based on a phone number.

The actions associated with block 1922 include the detection of an incoming or outgoing phone umber, and, retrieval of any flow control mode associated with the phone number. In one embodiment, this association would have been made previously using the process described for blocks 1916 through 1920. Continuing into block 1924, the associated flow control mode is used for the duration of this call, if there is one. The actions associated with block 1926 are those associated with the use of a default flow control mode when no flow control mode is otherwise known. This may happen if the incoming call is new or otherwise has never had a flow control mode set for it. The default flow control used may come from one of several sources. In one embodiment, there will be a default flow control mode set for all calls where no other optional mode is set or indicated, the default mode being set at the factory or by the network provider. In another embodiment the default mode may be set, or reset away from the factory settings, by a user at the UI. For maximum compatibility, in one embodiment the default will always be to set the default flow control mode to none (number 1 in the list above).

It will be appreciated that the particular options, outcomes, applications, screen shots and icons shown in the figures and described above are for illustrative purposes only and many other variations can be used according to the principles disclosed herein.

Although the above has been described with reference to certain specific embodiments, various modifications thereof will be apparent to those skilled in the art as outlined in the appended claims.

The invention claimed is:

1. A method of using flow control in a mobile teletypewriter (TTY) compatible device ("TTY device"), the TTY device configurable for use in a mobile telecommunications network, the method comprising:
    detecting one of an incoming or outgoing TTY call;
    determining a phone number associated with the detected call;
    selecting a flow control mode from a plurality of visually distinguishable flow control modes for use with the detected call according to the phone number associated with the detected call;
    displaying outgoing TTY text; and
    displaying incoming TTY text using one or more visual characteristics different than the outgoing TTY text according to the selected flow control mode.

2. The method according to claim 1 comprising, for selecting a flow control mode, using the determined phone number to determine an entry in an address book, and, using the flow control mode associated with the entry in the address book.

3. The method according to claim 2 where the plurality of flow controls comprises passive flow control.

4. The method according to claim 2 where the plurality of flow controls comprises active flow control.

5. The method according to claim 4 where the active flow control comprises a carriage return character.

6. The method according to claim 1 where the plurality of flow controls comprises no flow control.

7. The method of claim 1 where the one or more different visual characteristics comprises at least one of: color; shading; typeface; font size; italicized; bold; and underlined.

8. The method of claim 1 where the incoming TTY text is further displayed using an identifier at the start of the text.

9. The method of claim 8 where the identifier is a name associated with the determined phone number.

10. The method of claim 1 where the selecting a flow control mode comprises using a default flow control.

11. The method of claim 10 where the default flow control is one of: set by a factory; set by a network provider; and, set by having received an indication of a default flow control at a user interface (UI).

12. A method of setting a flow control mode in a mobile teletypewriter (TTY) compatible device ("TTY device"), the TTY device configurable for use in a mobile telecommunications network, the method comprising:
    receiving an indication that a flow control mode is to be set;
    detecting a phone number;
    detecting at a UI an indication of one from a plurality of flow control modes; and
    associating the phone number and the indicated flow control mode together in the TTY device, in a manner retrievable for future use.

13. The method according to claim 12 where the received indication that a flow control is to be set comprises detecting, at the UI, an indication to begin detecting a phone number.

14. The method according to claim 12 where the received indication that a flow control is to be set comprises detecting an incoming phone call, the phone call comprising a phone number, the phone number not having a flow control mode associated with it.

15. The method according to claim 12 where the plurality of flow controls comprises no flow control.

16. The method according to claim 12 where the plurality of flow controls comprises passive flow control.

17. The method according to claim 12 where the plurality of flow controls comprises active flow control.

18. The method according to claim 17 where the active flow control comprises a carriage return character.

19. The method according to claim 12 where the plurality of flow controls comprises the setting of one or more different visual characteristics to use with the phone number, the visual characteristics comprising: color; shading; typeface; font size; italicized; bold; and underlined.

20. A method of setting a visually distinguishable setting between incoming and outgoing teletypewriter (TTY) text in a mobile TTY compatible device ("TTY device"), the TTY device configurable for use in a mobile telecommunications network, the method comprising:
receiving an indication that a visual characteristic is to be set;
detecting a phone number;
detecting at a UI an indication of at least one from a plurality of visually distinguishable characteristics; and
associating the phone number and the indicated at least one visually distinguishable characteristics in a manner retrievable for future use.

21. The method of claim 20 where the visually distinguishable characteristics comprises one or more of: color; shading; typeface; font size; italicized; bold; and underlined.

22. A mobile teletypewriter (TTY) compatible device ("TTY device"), the TTY device configurable for use in a mobile telecommunications network and for using flow control, the TTY device operable to:
detect one of an incoming or outgoing TTY call;
determine a phone number associated with the detected call;
select a flow control mode from a plurality of visually distinguishable flow control modes for use with the detected call according to the phone number associated with the detected call;
display outgoing TTY text; and
display incoming TTY text using one or more visual characteristics different than the outgoing TTY text according to the selected flow control mode.

23. The TTY device according to claim 22 further operable to, for selecting a flow control mode, use the determined phone number to determine an entry in an address book, and, use the flow control mode associated with the entry in the address book.

24. A mobile teletypewriter (TTY) compatible device ("TTY device"), the TTY device configurable for use in a mobile telecommunications network and for setting a flow control mode, the TTY device operable to:
receive an indication that a flow control mode is to be set;
detect a phone number;
detect at a UI an indication of one from a plurality of flow control modes; and
associate the phone number and the indicated flow control mode together in the TTY device, in a manner retrievable for future use.

25. The TTY device according to claim 24 where the received indication that a flow control is to be set comprises detecting, at the UI, an indication to begin detecting a phone number.

26. The TTY device according to claim 24 where the received indication that a flow control is to be set comprises detecting an incoming phone call, the phone call comprising a phone number, the phone number not having a flow control mode associated with it.

27. A mobile teletypewriter (TTY) compatible device ("TTY device"), the TTY device configurable for use in a mobile telecommunications network and for setting a visually distinguishable setting between incoming and outgoing TTY text, the TTY device operable to:
receive an indication that a visual characteristic is to be set;
detect a phone number;
detect at a UI an indication of at least one from a plurality of visually distinguishable characteristics; and
associate the phone number and the indicated at least one visually distinguishable characteristics in a manner retrievable for future use.

* * * * *